United States Patent
Merlin et al.

(10) Patent No.: US 9,497,764 B2
(45) Date of Patent: *Nov. 15, 2016

(54) SYSTEMS AND METHODS FOR A DATA SCRAMBLING PROCEDURE

(71) Applicant: QUALCOMM Incorporated, San Diego, CA (US)

(72) Inventors: Simone Merlin, Solana Beach, CA (US); Didier Johannes Richard Van Nee, Tull en 't Waal (NL); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 14/330,599

(22) Filed: Jul. 14, 2014

(65) Prior Publication Data

US 2015/0016426 A1    Jan. 15, 2015

Related U.S. Application Data

(60) Provisional application No. 61/846,580, filed on Jul. 15, 2013.

(51) Int. Cl.
*H04W 4/00* (2009.01)
*H04W 72/04* (2009.01)
*H04W 84/18* (2009.01)
*H04L 1/00* (2006.01)
*H04L 1/18* (2006.01)
(Continued)

(52) U.S. Cl.
CPC .......... *H04W 72/0466* (2013.01); *H04L 1/007* (2013.01); *H04L 1/0041* (2013.01); *H04L 1/0075* (2013.01); *H04L 1/1812* (2013.01); *H04L 5/0053* (2013.01); *H04L 25/03866* (2013.01); *H04W 84/18* (2013.01)

(58) Field of Classification Search
CPC combination set(s) only.
See application file for complete search history.

(56) References Cited

U.S. PATENT DOCUMENTS 8,873,461 B2 * 10/2014 Kim .................... H04W 28/065
                                                  370/328
2003/0228850 A1   12/2003 Hwang
(Continued)

FOREIGN PATENT DOCUMENTS

EP       0778706 A2    6/1997
EP       1646173 A1    4/2006

OTHER PUBLICATIONS

International Search Report and Written Opinion—PCT/US2014/046675—ISA/EPO—Oct. 8, 2014.

*Primary Examiner* — Frank Duong
(74) *Attorney, Agent, or Firm* — Knobbe Martens Olson & Bear, LLP

(57) ABSTRACT

Systems, methods, and devices for communicating in a wireless network are provided. In one aspect, a method for wireless communication is provided. The method includes inserting a plurality of scrambler seeds into a data unit comprising a plurality of data portions, each scrambler seed associated with a respective data portion of the plurality of data portions. The method includes scrambling each data portion at least in part based on the associated scrambler seed. The method includes transmitting the data unit. The data portions may comprise code words or at least one media access control protocol data unit. The scrambler seed may be inserted in reserved bits of the delimiter field. The scrambler seed may be inserted in a delimiter signature field of the delimiter field.

22 Claims, 17 Drawing Sheets

(51) Int. Cl.
  *H04L 5/00*         (2006.01)
  *H04L 25/03*        (2006.01)

(56) References Cited

U.S. PATENT DOCUMENTS

| | | |
|---|---|---|
| 2005/0226414 A1 | 10/2005 | Lee et al. |
| 2005/0249244 A1 | 11/2005 | McNamara et al. |
| 2007/0121946 A1* | 5/2007 | Ito .................. H04L 1/0057 380/270 |
| 2007/0133804 A1* | 6/2007 | Kasher .................. H04K 1/00 380/270 |
| 2011/0199971 A1 | 8/2011 | Kim et al. |
| 2012/0195302 A1* | 8/2012 | Park .................. H04B 7/0452 370/338 |
| 2012/0263160 A1* | 10/2012 | Choi .................. H04L 1/0083 370/338 |
| 2012/0300874 A1 | 11/2012 | Zhang |
| 2012/0314869 A1* | 12/2012 | Zhang .................. H04W 28/06 380/287 |
| 2013/0121323 A1 | 5/2013 | Lilleberg et al. |
| 2013/0170411 A1 | 7/2013 | Vermani et al. |

* cited by examiner

SYSTEMS AND METHODS FOR A DATA SCRAMBLING PROCEDURE

CLAIM OF PRIORITY UNDER 35 U.S.C. §119

The present Application for Patent claims priority to Provisional Application No. 61/846,580 entitled "SYSTEMS AND METHODS FOR SCRAMBLING PROCEDURE" filed Jul. 15, 2013, and assigned to the assignee hereof. Provisional Application No. 61/846,580 is hereby expressly incorporated by reference herein.

BACKGROUND

Field

The present application relates generally to wireless communications, and more specifically to systems, methods, and devices for scrambling information transmitted in accordance with wireless communication protocols, such as members of the IEEE 802.11 family of wireless protocols.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages.

In some implementations, a method for wireless communication is provided. The method includes inserting an indication of a scrambling sequence into a signal field of a first data unit. The signal field occurs before a service field of the first data unit. The method further comprises scrambling at least a portion of the first data unit based at least on the inserted indication of the scrambling sequence in the signal field of the first data unit. The method further comprises transmitting the first data unit, the signal field being transmitted at a first data rate and the service field being transmitted at a second data rate greater than the first data rate.

In some other implementations, an apparatus for wireless communication is provided. The apparatus comprises a processor configured to insert an indication of a scrambling sequence into a signal field of a first data unit. The signal field occurs before a service field in the first data unit. The processor is further configured to scramble at least a portion of the first data unit based at least on the inserted indication of the scrambling sequence in the signal field of the first data unit. The apparatus further comprises a transmitter configured to transmit the first data unit, the signal field being transmitted at a first data rate and the service field being transmitted at a second data rate greater than the first data rate.

In some other implementations, a method for wireless communication is provided. The method comprises receiving a first data unit comprising a signal field received at a first data rate and a service field received at a second data rate greater than the first data rate. The signal field is received before the service field in the first data unit. The method comprises descrambling at least a portion of the first data unit based at least on an indication of a scrambling sequence inserted in the signal field of the first data unit.

In some other implementations, an apparatus for wireless communication is provided. The apparatus comprises a receiver configured to receive a first data unit comprising a signal field and a service field. The receiver is configured to receive the signal field at a first data rate before receiving the service field at a second data rate greater than the first data rate. The apparatus comprises a processor configured to descramble at least a portion of the first data unit based at least on an indication of a scrambling sequence inserted in the signal field of the first data unit.

In some other implementations, a method for wireless communication is provided. The method comprises inserting a plurality of scrambler seeds into a data unit comprising a plurality of data portions, each scrambler seed associated with a respective data portion of the plurality of data portions. The method comprises scrambling each data portion at least in part based on the associated scrambler seed. The method comprises transmitting the data unit.

In some other implementations, an apparatus for wireless communication is provided. The apparatus comprises a processor configured to insert a plurality of scrambler seeds into a data unit comprising a plurality of data portions, each scrambler seed associated with a respective data portion of the plurality of data portions. The processor is configured to scramble each data portion at least in part based on the associated scrambler seed. The apparatus comprises a transmitter configured to transmit the data unit.

In some other implementations, a method for wireless communication is provided. The method comprises receiving a data unit comprising a plurality of data portions. The method comprises identifying a plurality of scrambler seeds in the data unit, each scrambler seed associated with a respective data portion of the plurality of data portions. The method comprises descrambling each data portion at least in part based on the associated scrambler seed.

In some other implementations, an apparatus for wireless communication is provided. The apparatus comprises a receiver configured to receive a data unit comprising a plurality of data portions. The apparatus comprises a processor configured to identify a plurality of scrambler seeds in the data unit, each scrambler seed associated with a respective data portion of the plurality of data portions. The processor is configured to descramble each data portion based at least in part on the associated scrambler seed.

DETAILED DESCRIPTION

Figure 1:
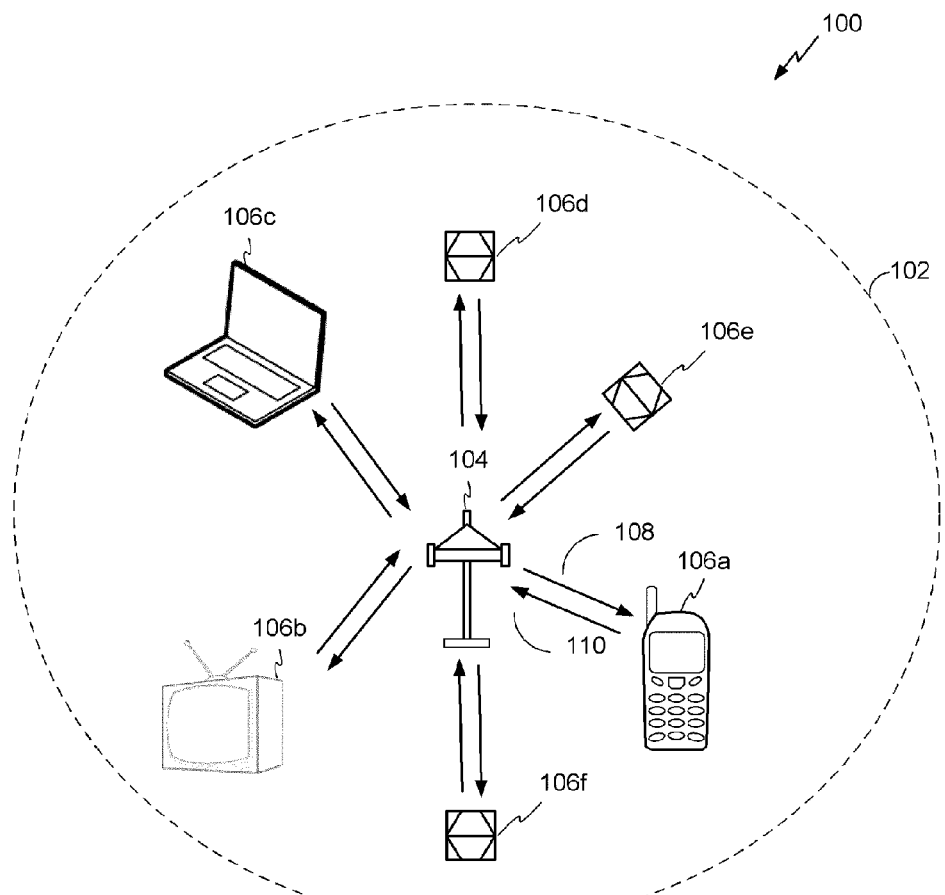
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and a STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations, an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an (access point) AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In some implementations, the AP 104 and STAs 106 can implement an automatic repeat request (ARQ) error-control procedure for data transmission. ARQ can use acknowledgements (ACKs) and timeouts to facilitate reliable data transmission. An ACK can include a message sent by a receiver indicating that it has correctly received a data frame or packet. A timeout can include a period of time allowed to elapse before a message is retransmitted. In other words, if a sender does not receive an ACK before the timeout, it can re-transmit the packet until the sender receives an ACK or exceeds a threshold number of retransmissions. In some implementations, the receiver discards packets that are not successfully decoded.

In some implementations, the AP 104 and STAs 106 can implement a hybrid ARQ (HARQ) error-control procedure for data transmission. HARQ can further implement error-correction codes to facilitate reliable data transmission. In various implementations, as used herein, error-correction codes can encompass any error-correction codes including, but not limited to, parity information, forward error-correction (FEC) codes, fountain codes, raptor codes, etc. In some implementations, "Parity," as used herein, refers to information that allows error correction of, e.g., a data unit. In some implementations described herein, parity is computed based on a data unit referred to as a "primary data unit." In these implementations, the term "primary" in "primary data unit" is used in order to express the relationship of the "primary data unit" to the "parity data unit." In these implementations, the "parity data unit" allows error correction of the "primary data unit." In some implementations, FEC encoding may be done with low density parity check (LDPC) codes.

In general, the HARQ protocol involves the receiver STA storing information regarding received code word signals when receiving a PPDU, even when those code words fail to decode correctly. The stored information can be decoded bits, original received data samples, bit likelihood values, etc. depending on the HARQ combining method being utilized, of which many are well known to those of skill in the art. The identity of failed code words is provided either explicitly or implicitly back to the transmitter STA. In response to this information, the transmitter STA sends a new PPDU with additional parity information and/or a retransmission of some of the previously transmitted bits. The additional parity information may be part or all of the originally punctured parity bits, or may be a new parity portion computed with a lower code rate. When received by the receiver STA, this newly received information is combined with the stored information to attempt again to decode the failed code word.

In some implementations, the sender can transmit additional packets including additional error-correction codes, when an ACK is not received. The receiver can store packets that are unsuccessfully decoded for later combination with additional packets including additional error-correction codes. Accordingly, the receiver can recover unsuccessfully decoded packets by matching the packets with the additional error-correction codes.

The STAs 106 are not limited in type and may include a variety of different STAs. For example, as illustrated in FIG. 1, STAs 106 can include a cellular phone 106a, a television 106b, a laptop 106c, and a number of sensors 106d-f (e.g. a weather sensor or other sensor capable of communicating using a wireless protocol), to name a few.

Figure 2:
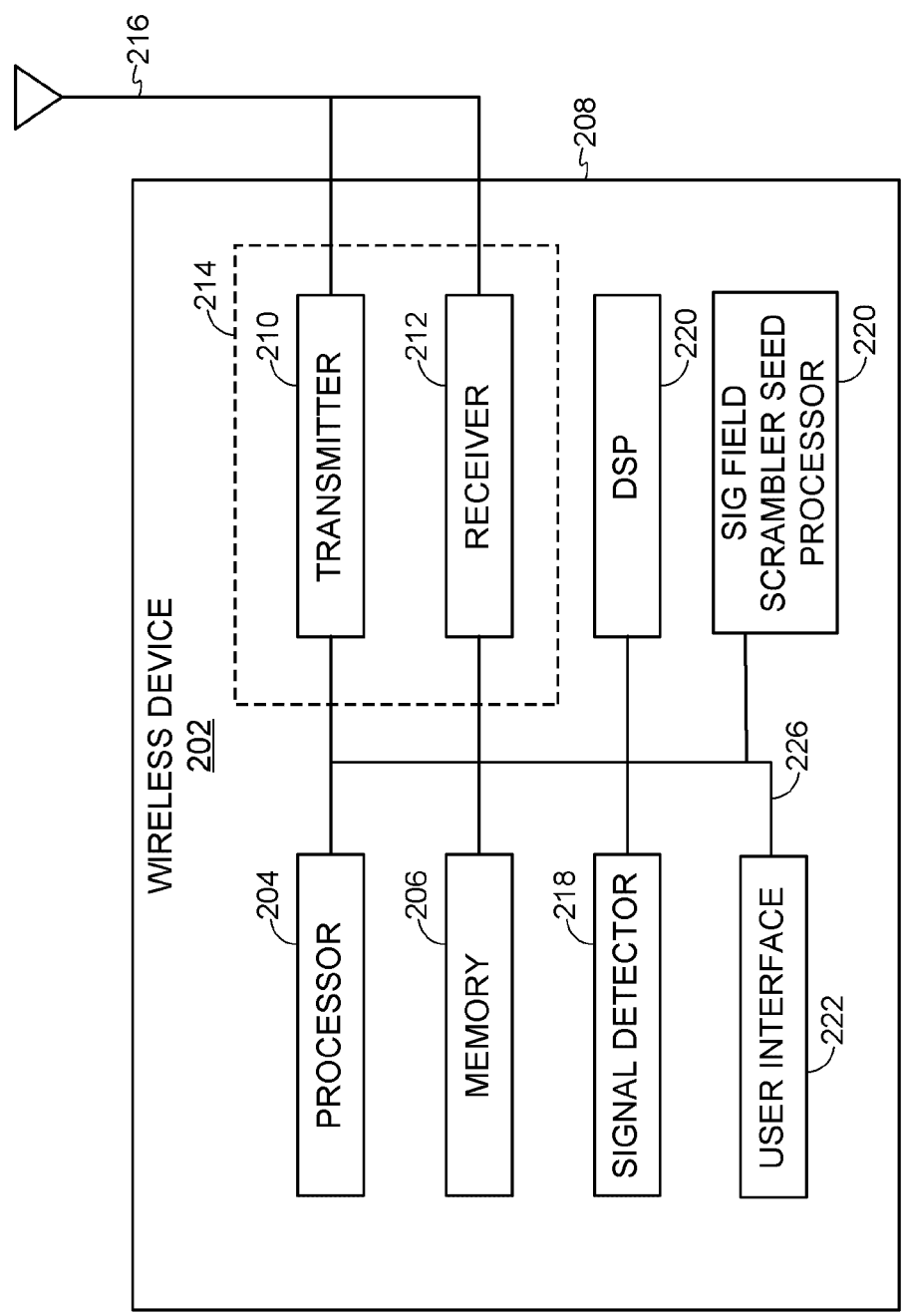
FIG. 2 shows a functional block diagram of an exemplary wireless device that may be employed within the wireless communication system of FIG. 1.

FIG. 2 shows a functional block diagram of an exemplary wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. Further, the transmitters 210 and the receiver 212 may be configured to allow transmission and reception of setup and/or configuration packets or frames between the wireless device 202 and a remote location including, for example, an AP. The transmitter 210 and receiver 212 may be combined into a transceiver 214. An antenna 216 may be attached to the housing 208 and electrically coupled to the transceiver 214. Alternatively, or additionally, the wireless device 202 may include an antenna 216 formed as part of the housing 208 or may be an internal antenna. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet or a frame.

In some implementations, the wireless device 202 may also include a SIG field scrambler seed processor 230 for use in processing signals. The SIG field scrambler seed processor 230 may be configured to generate a data unit for transmission. In some aspects, the data unit may comprise a physical layer data unit (PPDU). In some aspects, the PPDU is referred to as a packet or a frame. In some implementations, the SIG field scrambler seed processor 230 may insert a scrambler seed into the SIG field of a data unit. In some implementations described herein, the terms "scrambler seed" and "descrambler seed" may be used interchangeably. In some implementations, the SIG field scrambler seed processor 230 may scramble the data unit based on a scrambler seed inserted into the SIG field of a data unit. The SIG field scrambler seed processor 230 may not be present in certain implementations. Moreover, as those having ordinary skill in the art will appreciate, SIG field scrambler seed processor 230 may not be present if other components of wireless device 202 perform the operations described herein as performed by the SIG field scrambler seed processor 230. For example, processor 204 or DSP 220 may be designed to perform these operations in certain circumstances. Conversely, SIG field scrambler seed processor 230 may be able to perform functions described herein as performed by other components of wireless device 202, such as processor 204 or DSP 220.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be housed within a housing 208. Further, the various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together, or may accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

In certain wireless communications such as those specified in the IEEE 802.11ah protocol, a sub-gigahertz band may be used. This band may have a longer range than other higher bands, at the same transmission power. For example, these bands may have approximately twice the range of 2.4 GHz or 5 GHz bands, as used in IEEE 802.11n. This longer range may enable devices to communicate from a greater distance.

As discussed above, the wireless device 202 may comprise an AP 104 or an STA 106, and may be used to transmit and/or receive communications. Although the wireless device 202 of FIG. 2 is illustrated as including both a transmitter 210 and a receiver 212, some exemplary implementations may include the transmitter 210 and not the receiver 212, or in the alternative, the receiver 212 and not the transmitter 210. Where the wireless device 202 includes the transmitter 210 and/or the receiver 212, the wireless device 202 may additionally include one or more of the functional blocks described below in connection with FIGS. 3 and/or 4, respectively.

Figure 3:
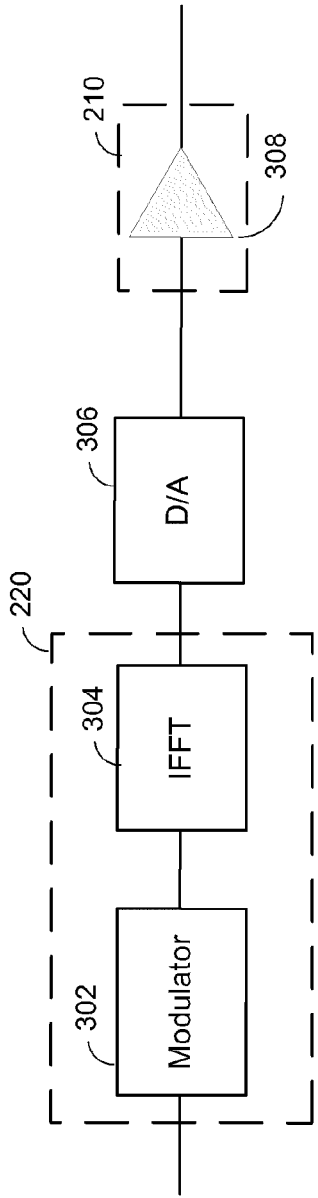
FIG. 3 shows a functional block diagram of exemplary components that may be utilized in the wireless device of FIG. 2 to transmit wireless communications.

FIG. 3 shows a functional block diagram of exemplary components that may be utilized in the wireless device 202 of FIG. 2 to transmit wireless communications. The components illustrated in FIG. 3 may be used, for example, to transmit OFDM communications. The wireless device 202 may comprise a modulator 302 configured to modulate bits for transmission. For example, the modulator 302 may determine a plurality of symbols from bits received from the processor 204 or the user interface 222, for example by mapping bits to a plurality of symbols according to a constellation. The bits may correspond to user data or to control information. In some aspects, the bits are received in code words. In one aspect, the modulator 302 comprises a QAM (quadrature amplitude modulation) modulator, for example a 16-QAM modulator or a 64-QAM modulator. In other aspects, the modulator 302 comprises a binary phase-shift keying (BPSK) modulator or a quadrature phase-shift keying (QPSK) modulator.

The wireless device 202 may further comprise a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there may be multiple transform modules (not shown) that transform units of data of different sizes.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202.

As discussed above, the DSP 220 may be configured to generate a data unit for transmission. In some aspects, the modulator 302 and the transform module 304 may be configured to generate a data unit comprising a plurality of fields including control information and a plurality of data symbols. The fields including the control information may comprise one or more training fields, for example, and one or more signal (SIG) fields. Each of the training fields may include a known sequence of bits or symbols. Each of the SIG fields may include information about the data unit, for example a description of a length or data rate of the data unit.

Returning to the description of FIG. 3, the wireless device 202 may further comprise a digital to analog converter (DAC) 306 configured to convert the output of the transform module into an analog signal. For example, the time-domain output of the transform module 306 may be converted to a baseband OFDM signal by the digital to analog converter 306. The digital to analog converter 306 may be implemented in the processor 204 or in another element of the wireless device 202. In some aspects, the digital to analog converter 306 is implemented in the transceiver 214 or in a data transmit processor.

The analog signal may be wirelessly transmitted by the transmitter 210. The analog signal may be further processed before being transmitted by the transmitter 210, for example by being filtered or by being upconverted to an intermediate or carrier frequency. In the aspect illustrated in FIG. 3, the transmitter 210 includes a transmit amplifier 308. Prior to being transmitted, the analog signal may be amplified by the transmit amplifier 308. In some aspects, the amplifier 308 comprises a low noise amplifier (LNA).

The transmitter 210 is configured to transmit one or more packets or data units in a wireless signal based on the analog signal. The data units may be generated using the processor 204 and/or the DSP 220, for example using the modulator 302 and the transform module 304 as discussed above. Data units that may be generated and transmitted as discussed above are described in additional detail below.

Figure 4:
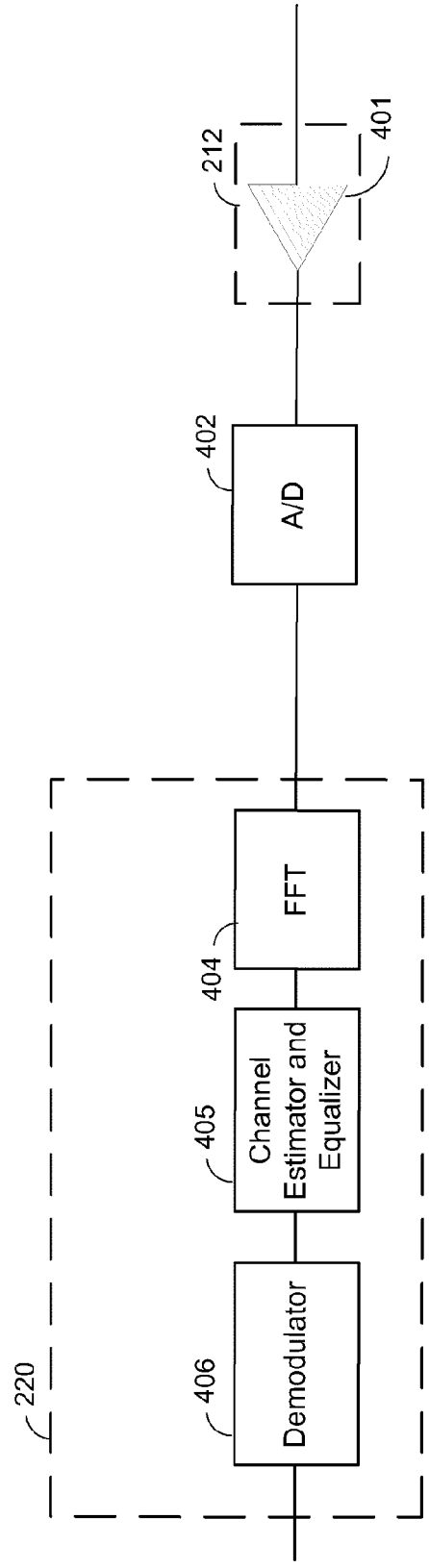
FIG. 4 shows a functional block diagram of exemplary components that may be utilized in the wireless device of FIG. 2 to receive wireless communications.

FIG. 4 shows a functional block diagram of exemplary components that may be utilized in the wireless device 202 of FIG. 2 to receive wireless communications. The components illustrated in FIG. 4 may be used, for example, to receive OFDM communications. In some aspects, the components illustrated in FIG. 4 are used to receive data units that include one or more SIGNAL units, as will be discussed in additional detail below. For example, the components illustrated in FIG. 4 may be used to receive data units transmitted by the components discussed above with respect to FIG. 3.

The receiver 212 is configured to receive one or more packets or data units in a wireless signal. Data units that may be received and decoded or otherwise processed as discussed below are described in additional detail with respect to FIGS. 5-9.

In the aspect illustrated in FIG. 4, the receiver 212 includes a receive amplifier 401. The receive amplifier 401 may be configured to amplify the wireless signal received by the receiver 212. In some aspects, the receiver 212 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 comprises an LNA.

The wireless device 202 may comprise an analog to digital converter 402 configured to convert the amplified wireless signal from the receiver 212 into a digital representation thereof. Further to being amplified, the wireless signal may be processed before being converted by the digital to analog converter 402, for example by being filtered or by being downconverted to an intermediate or baseband frequency. The analog to digital converter 402 may be implemented in the processor 204 or in another element of the wireless device 202. In some aspects, the analog to digital converter 402 is implemented in the transceiver 214 or in a data receive processor.

The wireless device 202 may further comprise a transform module 404 configured to convert the representation of the wireless signal into a frequency spectrum. In FIG. 4, the transform module 404 is illustrated as being implemented by a fast Fourier transform (FFT) module. The transform module 404 may be programmable, and may be configured to perform FFT with different configurations. In one aspect, for example, the transform module 404 may be configured to perform either a 32-point FFT or a 64-point FFT. In some aspects, the transform module may identify a symbol for each point that it uses.

The wireless device 202 may further comprise a channel estimator and equalizer 405 configured to form an estimate of the channel over which the data unit is received, and to remove certain effects of the channel based on the channel estimate. For example, the channel estimator may be configured to approximate a function of the channel, and the channel equalizer may be configured to apply an inverse of that function to the data in the frequency spectrum.

In some aspects, the channel estimator and equalizer 405 uses information in one or more received training fields, such as a long training field (LTF) for example, to estimate the channel. The channel estimate may be formed based on one or more LTFs received at the beginning of the data unit. This channel estimate may thereafter be used to equalize data symbols that follow the one or more LTFs. After a certain period of time or after a certain number of data symbols, one or more additional LTFs may be received in the data unit. The channel estimate may be updated or a new estimate formed using the additional LTFs. This new or update channel estimate may be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202 may further comprise a demodulator 406 configured to demodulate the equalized data. For example, the demodulator 406 may determine a plurality of bits from symbols output by the transform module 404 and the channel estimator and equalizer 405, for example by reversing a mapping of bits to a symbol in a constellation. The bits may be processed or evaluated by the processor 204, or used to display or otherwise output information to the user interface 222. In this way, data and/or information may be decoded. In some aspects, the bits correspond to code words. In one aspect, the demodulator 406 comprises a QAM (quadrature amplitude modulation) demodulator, for example a 16-QAM demodulator or a 64-QAM demodulator. In other aspects, the demodulator 406 comprises a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 or in another element of the wireless device 202.

As discussed above, the wireless signal received at the receiver 212 comprises one or more data units. Using the functions or components described above, the data units or data symbols therein may be decoded evaluated or otherwise evaluated or processed. For example, the processor 204 and/or the DSP 220 may be used to decode data symbols in the data units using the transform module 404, the channel estimator and equalizer 405, and the demodulator 406.

Data units exchanged by the AP 104 and the STA 106 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. In various implementations, data units can include Mac Protocol Data Units (MPDU) and/or Aggregated Mac Protocol Data Units (A-MPDU). The payload may be transmitted using one or more data symbols. The systems, methods, and devices herein may utilize data units with training fields whose peak-to-power ratio has been minimized.

Certain implementations described herein may be directed to wireless communication systems that may be used for smart metering or be used in a smart grid network. These wireless communication systems may be used to provide sensor applications or be used in home automation. Wireless devices used in such systems may instead or in addition be used in a healthcare context, for example, for personal healthcare. They may also be used for surveillance, to enable extended-range Internet connectivity (e.g., for use with hotspots), or to implement machine-to-machine communications. Accordingly, some implementations may use low data rates such as approximately 150 Kbps. Implementations may further have increased link budget gains (e.g., around 20 dB) over other wireless communications such as 802.11b. In accordance with low data rates, if wireless nodes are configured for use in a home environment, certain aspects may be directed to implementations with good in-home coverage without power amplification. Furthermore, certain aspects may be directed to single-hop networking without using a MESH protocol. In addition, certain implementations may result in significant outdoor coverage improvement with power amplification over other wireless protocols. Furthermore, certain aspects may be directed to implementations that may accommodate large outdoor delay-spread and reduced sensitivity to Doppler. Certain implementations may achieve similar LO accuracy as traditional WiFi.

Accordingly, certain implementations are directed to sending wireless signals with low bandwidths in sub-gigahertz bands. For example, in one exemplary implementation, a symbol may be configured to be transmitted or received using a bandwidth of 1 MHz. The wireless device 202 of FIG. 2 may be configured to operate in one of several modes. In one mode, symbols such as OFDM symbols may be transmitted or received using a bandwidth of 1 MHz. In another mode, symbols may be transmitted or received using a bandwidth of 2 MHz. Additional modes may also be provided for transmitting or receiving symbols using a bandwidth of 4 MHz, 8 MHz, 16 MHz, 20 MHz, 40 MHz, 80 MHz, and the like. The bandwidth may also be referred to as the channel width.

Each mode may use a different number of tones/subcarriers for transmitting the information. For example, in one implementation, a 1 MHz mode (corresponding to transmitting or receiving symbols using a bandwidth of 1 MHz) may use 32 tones. In one aspect, using a 1 MHz mode may provide for a 13 dB noise reduction as compared to a bandwidth such as 20 MHz. In addition, low rate techniques may be used to overcome effects such as frequency diversity losses due to a lower bandwidth which could result in 4-5 dB losses depending on channel conditions. To generate/evaluate symbols sent or received using 32 tones, a transform module 304 or 404 as described above with reference to FIGS. 3 and 4 above may be configured to use a 32 point mode (e.g., a 32 point IFFT or FFT). The 32 tones may be allocated as data tones, pilot tones, guard tones, and a DC tone. In one implementation, 24 tones may be allocated as data tones, 2 tones may be allocated as pilot tones, five tones may be allocated as guard tones, and 1 tone may be reserved for the DC tone. In this implementation, the symbol duration may be configured to be 40 μs including cyclic prefix. Other tone allocations are also possible.

For example, the wireless device 202 (FIGS. 2 and/or 3) may be configured to generate a packet for transmission via a wireless signal using a bandwidth of 1 MHz. In one aspect, the bandwidth may be approximately 1 MHz where approximately 1 MHz may be within a range of 0.8 MHz to 1.2 MHz. The packet may be formed of one or more OFDM symbols having 32 tones allocated as described using a DSP 320 (FIG. 3) or other processor as described above. A transform module 304 (FIG. 3) in a transmit chain may be configured as an IFFT module operating according to a thirty-two point mode to convert the packet into a time domain signal. A transmitter 310 (FIG. 3) may then be configured to transmit the packet.

Likewise, the wireless device 202 (FIGS. 2 and/or 4) may be configured to receive the packet over a bandwidth of 1 MHz. In one aspect, the bandwidth may be approximately 1 MHz where approximately 1 MHz may be within a range of 0.8 MHz to 1.2 MHz. The wireless device 202 may include a DSP 420 including a transform module 404 (FIG. 4) in a receive chain that may be configured as an FFT module operating according to a thirty-two point mode to transform the time domain signal into a frequency spectrum. A DSP 420 may be configured to evaluate the packet. The 1 MHz mode may support a modulation and coding scheme (MCS) for both a low data rate and a "normal" rate. According to some implementations, the preamble 702 may be designed for a low rate mode that offers reliable detection and improved channel estimation as will be further described below. Each mode may be configured to use a corresponding preamble configured to optimize transmissions for the mode and desired characteristics.

In addition to a 1 MHz mode, a 2 MHz mode may additionally be available that may be used to transmit and receive symbols using 64 tones. In one implementation, the 64 tones may be allocated as 52 data tones, 4 pilot tones, 1 DC tone, and 7 guard tones. As such, a transform module 304 or 404 of FIGS. 3 and 4 may be configured to operate according to a 64 point mode when transmitting or receiving 2 MHz symbols. The symbol duration may also be 40 μs including cyclic prefix. Additional modes with different bandwidths (e.g., 4 MHz, 8 MHz, and 16 MHz) may be provided that may use transform modules 304 or 404 operating in modes of corresponding different sizes (e.g., 128 point FFT, 256 point FFT, 512 point FFT, etc.). In addition, each of the modes described above may be configured additionally according to both a single user mode and a multi user mode. Wireless signals using bandwidths less than or equal to 2 MHz may provide various advantages for providing wireless nodes that are configured to meet global regulatory constraints over a broad range of bandwidth, power, and channel limitations.

As described above, the wireless device 202 may comprise an AP 104 or a STA 106, and may be used to transmit and/or receive media access control (MAC) frames of different types.

Figure 5A:
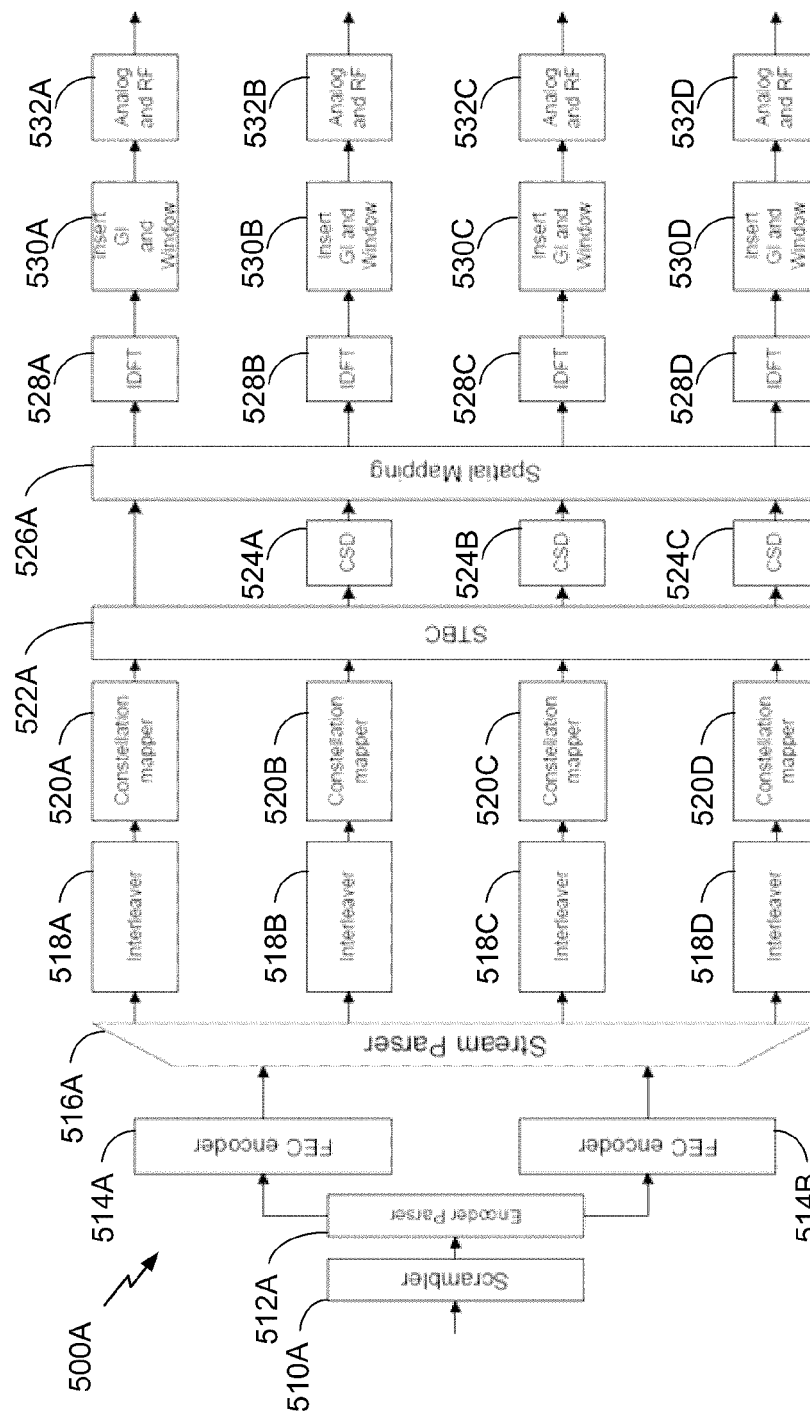
FIG. 5A shows a functional block diagram for scrambling data before encoding the data, in accordance with at least some of the IEEE 802.11 family of wireless protocols.

FIG. 5A shows a functional block diagram 500A for scrambling data before encoding the data, in accordance with at least some of the IEEE 802.11 family of wireless protocols. In the functional block diagram 500A, data units may be scrambled by scrambler 510A prior to being encoded. For example, the scrambler 510A may scramble data received at an input of the scrambler 510A and output the scrambled data to an encoder parser 512A. The encoder parser 512A may divide or demultiplex the scrambled data among a plurality of forward error correction (FEC) encoders (e.g., FEC encoders 514A and 514B). In some implementations, the encoder parser 512A may divide or demultiplex the scrambled data in a round robin manner. Each of the FEC encoders 514A/1514B may then encode the divided or demultiplexed scrambled data and forward the encoded scrambled data to a stream parser 516A. The stream parser 516A may further divide or demultiplex the encoded scrambled data among a plurality of interleavers (e.g., interleavers 518A, 518B, 518C and 518D). Each of the interleavers 518A-518D may shuffle one or more symbols of the encoded scrambled data among a plurality of code words in order to improve FEC performance. Each of the interleavers 518A-518D may then output the interleaved encoded scrambled data to a respective constellation mapper (e.g., constellation mappers 520A-520D, respectively). Each of the constellation mappers 520A-520D may map received interleaved encoded scrambled data to corresponding signal constellations. The constellation mappers 520A-520D may then provide an output to a spatial time block coder 522A, which may provide spatial time block coding of the received mapped, interleaved encoded scrambled data. At least some of the outputs of the spatial time block coder 522A may be input to respective circuit switches 524A, 524B, 524C, and then output to a spatial mapper 526A. The spatial mapper 526A may then provide an output to each of a plurality of inverse discrete fourier transformers (e.g., IDFTs 528A-528D). Each of the IDFTs 528A-528D may provide an output to a respective module for inserting at least a guard interval (GI) into the data (e.g., modules 530A-530D). Each of the modules 530A-530D may then provide an output to a respective one of a plurality of digital to analog and radio frequency modules (e.g., modules 532A-532D). Each of the modules 532A-532D may convert received signals from a digital to an analog signal. The modules 532A-532D may additionally modulate the analog-converted signals onto a radio frequency (RF) carrier signal for transmission.

Figure 5B:
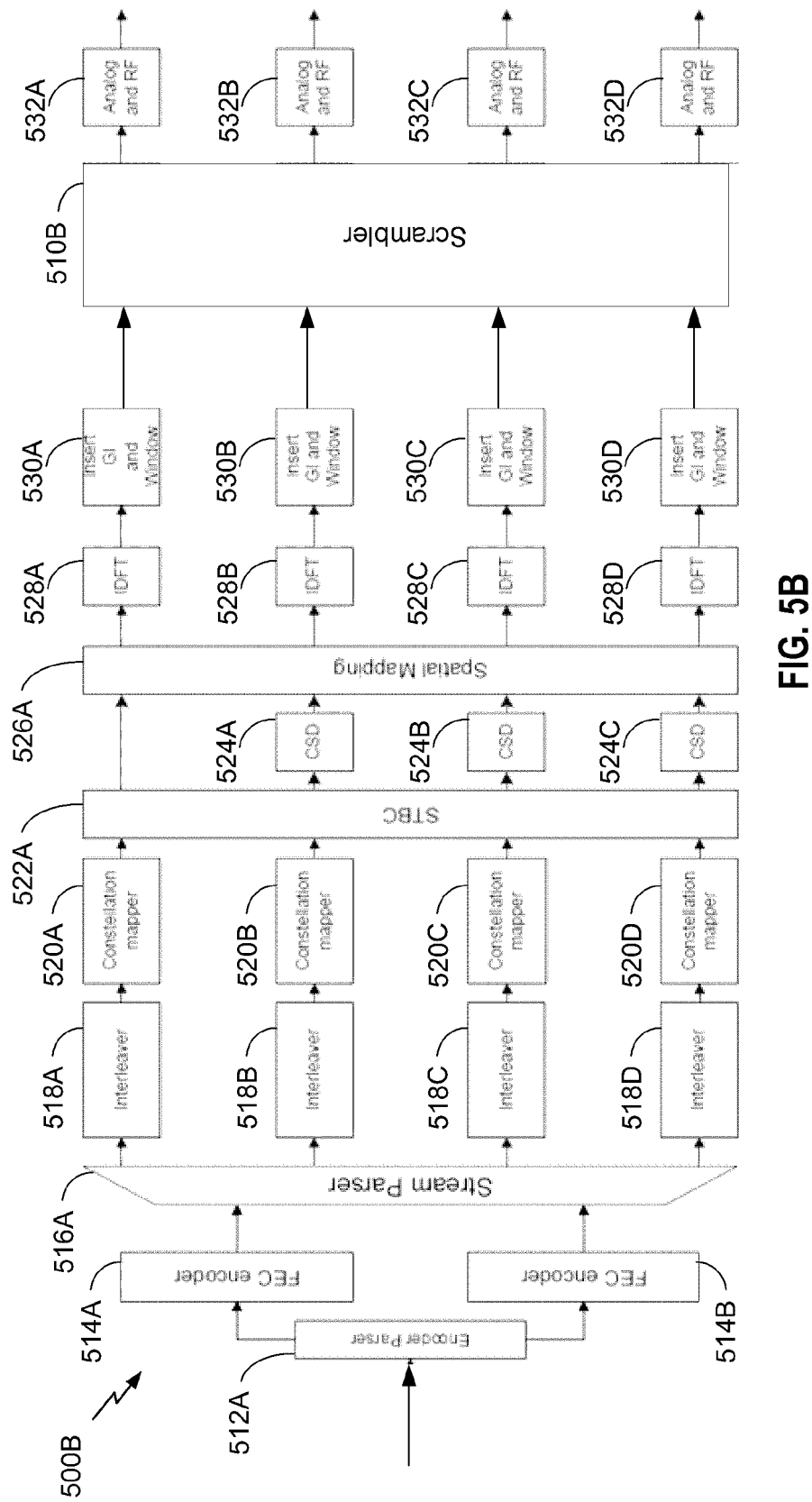
FIG. 5B shows a functional block diagram for encoding data before scrambling the data, as may be employed within the wireless device of FIG. 2.

FIG. 5B shows a functional block diagram 500B for encoding data before scrambling the data, as may be employed within the wireless device of FIG. 2. The block diagram 500B may comprise the same components as previously described in connection with FIG. 5A with the exception that the scrambler 510A is not located upstream from the encoder parser 512A. Instead a scrambler 510B is located between the plurality of modules 530A-530D and the plurality of modules 532A-532D. Thus, in functional block diagram 500B, data units are scrambled by scrambler 510B after being encoded. In some implementations, the functional blocks of diagram 500B may be configured to carry out some or all of the steps of any of methods that will be described in more detail in connection with FIGS. 9, 11, 14, 16, 18 and 20 below.

Figure 5C:
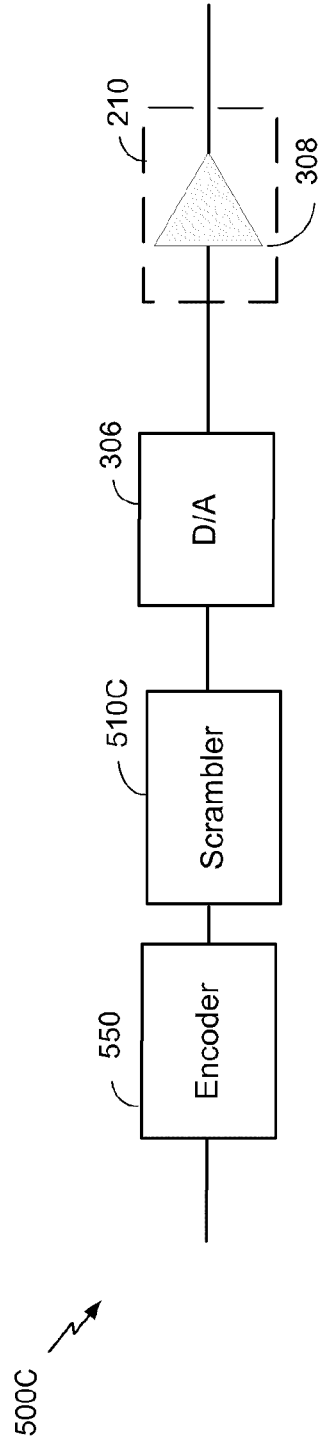
FIG. 5C shows another functional block diagram of exemplary components that may be employed in the wireless device of FIG. 2.

FIG. 5C shows another functional block diagram 500C of exemplary components that may be employed in the wireless device of FIG. 2. The components illustrated in functional block diagram 500C may correspond to one or more components as previously described in connection with FIG. 3 and/or FIG. 5B. For example, the encoder 550 may correspond to one or more components located in the signal flow from the encoder parser 512A to the modules 530A-530D, as previously described in connection with FIG. 5B. The scrambler 510C may correspond to the scrambler 510B as previously described in connection with FIG. 5B. The digital-to-analog (D/A) converter 306 may be the same D/A converter 306 as previously described in connection with FIG. 3 and/or may correspond to one or more circuits within the modules 532A-532D as previously described in connection with FIG. 5B. The transmit amplifier 308 within the transmitter 210 may be the same transmit amplifier 308 within the same transmitter 210 as previously described in connection with FIG. 3. The components of FIG. 5C may allow for a data unit (e.g., the data unit 500b/500c of FIGS. 5B/5C) to be encoded by encoder 550, then scrambled by scrambler 510C, prior to digital to analog conversion by D/A 306 and transmission by transmitter 210. In an implementation, scrambler 510C may comprise a processor, such as processor 204 or DSP 220 of FIG. 2. Scrambler 510C may also include one or more of a processor, signal generator, transceiver, decoder, or a combination of hardware and/or software component(s), circuits, and/or module(s). In an implementation, encoder 550 may comprise a processor, such as processor 204 or DSP 220 of FIG. 2. Encoder 550 may also include one or more of a processor, signal generator, transceiver, decoder, or a combination of hardware and/or software component(s), circuits, and/or module(s).

In some implementations, the components of functional block diagram 500C advantageously allow for the direct combining of primary data units and parity data units, or of primary data units and retransmissions of the primary data units, at a receiving device in an attempt to recover incorrectly decoded data. In some implementations, the components of functional block diagram 500C overcome problems with directly combining primary data units and parity data units or retransmissions of the primary data units arising from the data units being scrambled with different sequences prior to encoding. In some implementations, the functional blocks of diagram 500C may be configured to carry out some or all of the steps of any of methods that will be described in more detail in connection with FIGS. 9, 11, 14, 16, 18 and 20 below.

Figure 5D:
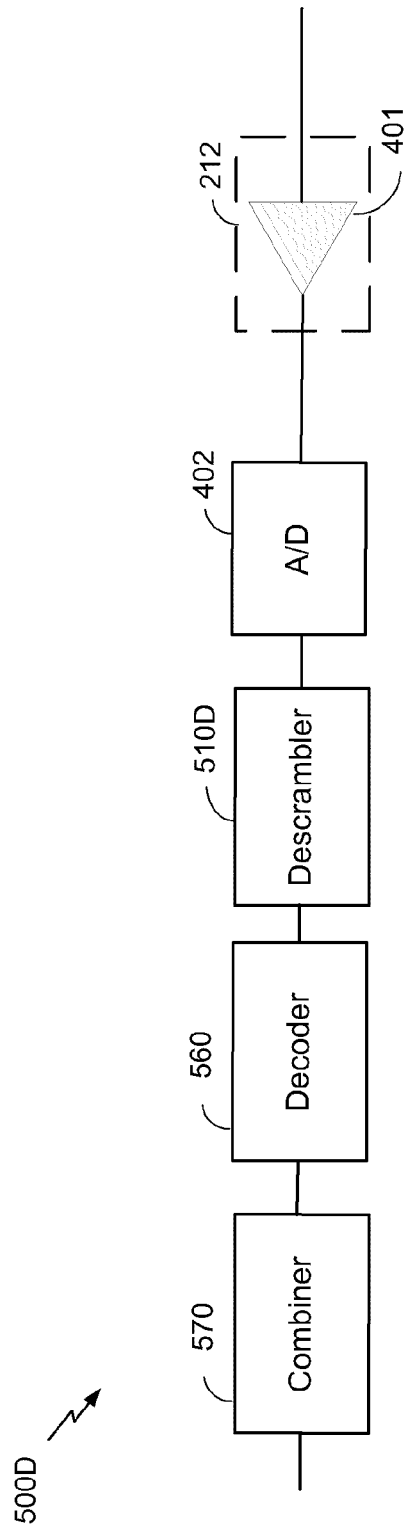
FIG. 5D shows another functional block diagram of exemplary components that may be employed in the wireless device of FIG. 2.

FIG. 5D shows another functional block diagram 500D of exemplary components that may be employed in the wireless device of FIG. 2. At least some of the components illustrated in functional block diagram 500D may correspond to one or more components as previously described in connection with FIGS. 4 and/or 5C. For example, the analog to digital converter 402 may be the same A/D converter 402 as previously described in connection with FIG. 4. The receive amplifier 401 within receiver 212 may be the same receive amplifier 401 within the receiver 212 as previously described in connection with FIG. 4. The descrambler 510D may correspond to and have the opposite operation from the scrambler 510C of FIG. 5C (e.g., descramble a data unit that was previously scrambled by scrambler 510C). Likewise decoder 560 may correspond to and have the opposite operation from the encoder 550 of FIG. 5C (e.g., decode a data unit that was previously encoded by encoder 550). The components of the block diagram 500D may allow for a data unit, such as data unit 500b/500c of FIGS. 5B/5C, to be descrambled by descrambler 510D, decoded by decoder 560, then combined with a parity data unit, or alternatively a retransmission of the data unit 500b/500c. In an implementation, the descrambler 510D may comprise a processor, such as processor 204 or DSP 220 of FIG. 2. The descrambler 510D may also include one or more of a processor, signal generator, transceiver, decoder, or a combination of hardware and/or software component(s), circuits, and/or module(s). In an implementation, the decoder 560 may comprise a processor, such as processor 204 or DSP 220 of FIG. 2. The decoder 560 may also include one or more of a processor, signal generator, transceiver, decoder, or a combination of hardware and/or software component(s), circuits, and/or module(s). In an implementation, combiner 570 may comprise a processor, such as processor 204 or DSP 220 of FIG. 2. Combiner 570 may also include one or more of a processor, signal generator, transceiver, decoder, or a combination of hardware and/or software component(s), circuits, and/or module(s).

In some implementations, the components of the functional block diagram 500D advantageously allow for the direct combining of primary data units and parity data units or retransmissions of the primary data units at a receiving device in an attempt to recover incorrectly decoded data. In some implementations, the components of the functional block diagram 500D overcome problems with directly combining primary data units and parity data units or retransmissions of the primary data units arising from the data units being scrambled with different sequences prior to encoding. In some implementations, the functional blocks of diagram 500D may be configured to carry out some or all of the steps of any of methods that will be described in more detail in connection with FIGS. 10, 12, 13, 15, 17, 19 and 21 below.

Figure 6A:
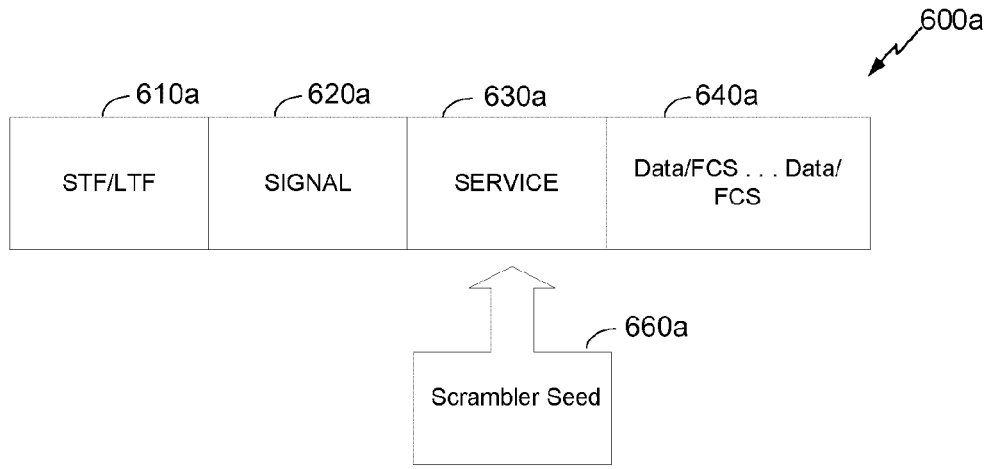
FIG. 6A illustrates an example of a data unit or wireless frame.

FIG. 6A illustrates an example of a data unit or wireless frame 600a. The data unit 600a may comprise a PPDU for use with the wireless device 202. The data unit 600a includes a short training field (STF) and/or a long training field (LTF) 610a. Following STF/LTF 610a in the data unit 600a is a SIGNAL field 620a. The terms "SIGNAL unit," "SIGNAL field," "signal unit," "signal field," "SIG field," and "sig field," may be used interchangeably herein. SIGNAL field 620a may include various information relating to the transmission rate, the length of the data unit 600a, and the like. SIGNAL field 620a is contained in a preamble of data unit 600a. The data unit 600a may additionally comprise a SERVICE field 630a. As is reflected in FIG. 6A, SERVICE field 630a may contain scrambler seed 650a. Data/FCS 640a may contain one or more data fields and/or frame check sequence (FCS) fields. Data/FCS 640a may be scrambled based on scrambler seed 650a. Importantly, when scrambler seed 650a is contained in SERVICE field 630a, bottlenecking may occur at a wireless device 202 that receives data unit 600a if the code word that the SERVICE field 630a is contained in is corrupted or incompletely received. In such a circumstance, additional parity on code words after the first code word is not useful.

Figure 6B:
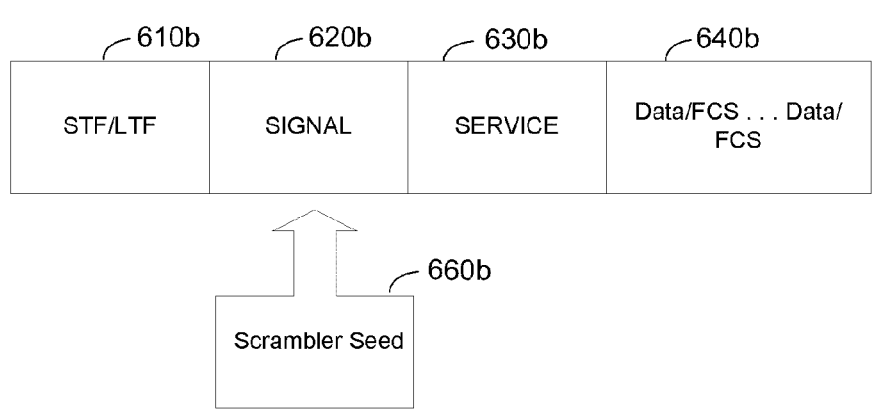
FIG. 6B illustrates a data unit or wireless frame, in accordance with some implementations.

FIG. 6B illustrates an example of a data unit or wireless frame 600b, in accordance with some implementations. The data unit 600b may comprise a PPDU for use with the wireless device 202. In some implementations, data unit 600b can be created by SIG field scrambler seed processor 230 of wireless device 202. The data unit 600b includes STF/LTF 610b. Following STF/LTF 610b in the data unit 600b is a SIGNAL field 620b. In an implementation, SIGNAL field 620b may include various information relating to the transmission rate, the length of the data unit 600b, and the like. SIGNAL field 620b is contained in a preamble of data unit 600b.

In an implementation, SIGNAL field 620b may contain scrambler seed 650b. Data/FCS 640b may contain one or more data fields and/or frame check sequence (FCS) fields. Data/FCS 640b (e.g., a portion of the data unit 600b) may be scrambled with a scrambler seed based on scrambler seed 650b. Data unit 600b may optionally contain SERVICE field 630b. Advantageously, the placement of scrambler seed 650b in SIGNAL field 620b prevents the bottlenecking discussed in relation to data unit 600a. Bottlenecking is prevented because SIGNAL field 620b, as part of the preamble of data unit 600b, is transferred at more robust modulation levels (e.g., at a lower data rate) than SERVICE field 630b. Further, if the preamble of data unit 600b fails, the entire packet must be retransmitted anyway, thus not allowing a bottleneck to occur. Additionally, in one implementation, by containing scrambler seed 650b in SIGNAL field 620b, data unit 600b may optionally not contain SERVICE field 630b. In another implementation, SERVICE field 630b may also optionally be retained, but simply not used, in order to retain the current design of data unit 600b. In another implementation, SERVICE field 630b may optionally have all of its bits set to 0. In another implementation, scrambler seed 650b may be less than 7 bits. For example, in this implementation scrambler seed 650b may be 1 or 2 bits.

In an implementation, the placement of scrambler seed 650b in SIGNAL field 620b is also advantageous as it allows for more efficient use of a parity data unit that also contains a scrambler seed in its SIGNAL field. In this implementation, a wireless device 202 that receives data unit 600b and a parity data unit will know the scrambler seed of each and can compensate for the difference of the scrambler seeds. In an implementation, compensation comprises changing the signs of the stored data values at the receiver based on the difference of the data unit 600b scrambler seed and the parity data unit scrambler seed. After wireless device 202 compensates for the difference of the scrambler seeds, wireless device 202 can then combine the parities directly.

In an implementation, SIGNAL field 620b does not contain scrambler seed 650b. Instead, scrambler seed 650b is determined from one or more parameters indicated in SIGNAL field 620b, thus rendering insertion of scrambler seed 650b into SIGNAL field 620b unnecessary. Advantageously, determining scrambler seed 650b from one or more parameters indicated in SIGNAL field 620b prevents the bottlenecking discussed in relation to data unit 600a. Bottlenecking is prevented because SIGNAL field 620b, as part of the preamble of data unit 600b, is transferred at more robust modulation levels (e.g., at a lower data rate) than SERVICE field 630b. Further, if the preamble of data unit 600b fails, the entire packet must be retransmitted anyway, thus not allowing a bottleneck to occur. Additionally, in one implementation, by determining scrambler seed 650b from one or more parameters in SIGNAL field 620b, data unit 600b may optionally not contain SERVICE field 630b. In another implementation, SERVICE field 630b may also optionally be retained, but simply not used, in order to retain the current design of data unit 600b. In another implementation, SERVICE field 630b may optionally have all of its bits set to 0. In another implementation, SERVICE field 630b may optionally contain less than 7 bits.

Figure 6C:
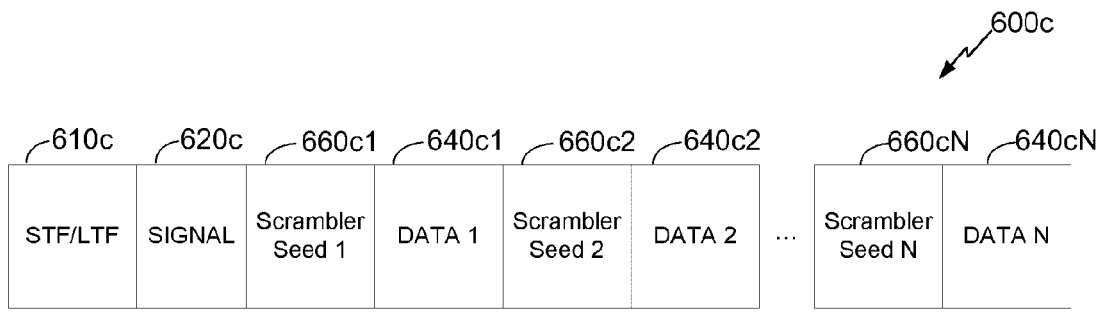
FIG. 6C shows a data unit or wireless frame, in accordance with some implementations.

FIG. 6C illustrates an example of a data unit or wireless frame 600c, in accordance with some implementations. The data unit 600c may comprise a PPDU for use with the wireless device 202. In some implementations, data unit 600c can be created by DSP 220 of wireless device 202. The data unit 600s includes STF/LTF 610c. Following STF/LTF 610c in the data unit 600c is a SIGNAL field 620c. In an implementation, SIGNAL field 620c may include various information relating to the transmission rate, the length of the data unit 600c, and the like. SIGNAL field 620c is contained in a preamble of data unit 600c. In an implementation, as is reflected in FIG. 6C, a plurality of scrambler seeds may be contained in data unit 600c, with each scrambler seed (650c1, 650c2, 650cN) being associated with a particular code word/data field (640c1, 640c2, 640cN). In this implementation, each scrambler seed (650c1, 650c2, 650cN) is contained before the code word/data field (640c1, 640c2, 640cN) it is associated with. In this implementation, the scrambling/encoding procedure used at wireless device 202 must be adapted so that data portion sizes are predefined in order to allow scrambling before each code word. In some implementations, the predefined sizes may be noted in SIGNAL field 620c. Advantageously, this implementation prevents the bottlenecking discussed in relation to data unit 600a as each code word/data field (e.g., a portion of the data unit 600c) is scrambled independently of other code words/data fields. As one skilled in the art will recognize, both greater and fewer numbers of sets of scrambler seeds and associated code words/data fields are possible than are reflected in FIG. 6C.

The data units 600b and 600c illustrated in FIGS. 6B and 6C are only examples of data units that may be used in the system 100 and/or with the wireless device 202. Those having ordinary skill in the art will appreciate that one or more symbols or fields may be included in the data units 600b and 600c that are not illustrated in FIGS. 6B and 6C, and one or more of the illustrated fields or symbols may be omitted.

Some implementations of wireless networks may utilize different versions of a wireless frame 600 to reduce overhead or the power required to receive the wireless frame. For example, some implementations may utilize a wireless frame that is physically shorter, or includes fewer bytes, than frames 600b and/or 600c.

Figure 7A:
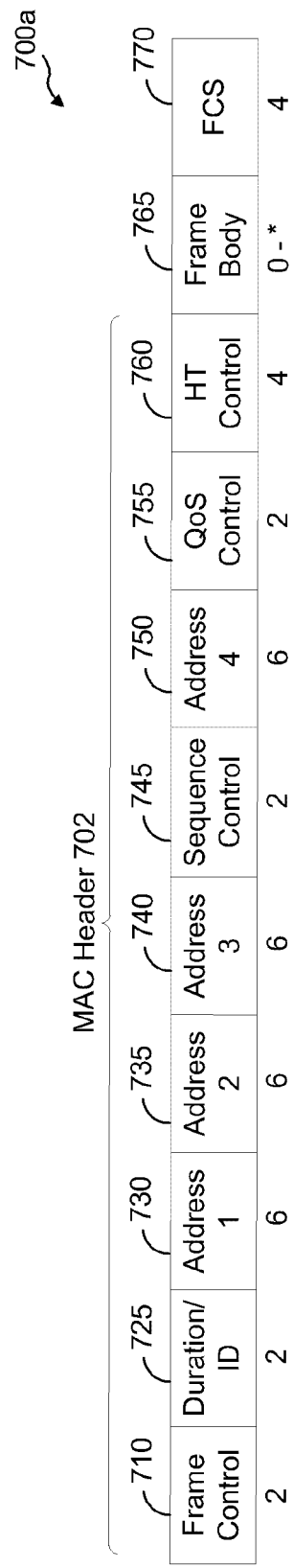
FIG. 7A shows an exemplary structure of a media access control protocol data unit (MPDU) frame.

FIG. 7A shows an exemplary structure of a media access control protocol data unit (MPDU) frame 700a. As shown, the MPDU frame 700 includes 11 different fields: a frame control (fc) field 710, a duration/identification (dur) field 725, a receiver address (a1) field 730, a transmitter address (a2) field 735, a destination address (a3) field 740, a sequence control (sc) field 745, a fourth address (a4) field 750, a quality of service (QoS) control (qc) field 755, a High Throughput (HT) control field 760, the frame body 765, and a frame check sequence (FCS) field 770. The fields 710-760 make up the MAC header 702.

Each of the fields of a media access control frame may be considered a media access control parameter. Additionally, each field may be comprised of one or more sub-fields or fields. For example, frame control field 710 of media access control header 702 may be comprised of multiple subfields, such as a protocol version, type field, subtype field, and other fields. Each of these subfields or fields may also be considered a media access control parameter. In some implementations, individual bits of a media access control frame may be considered a media access control parameter.

Each of the a1, a2, a3, and a4 fields 730, 735, 740, and 750 comprises a full MAC address of a device, which is a 48-bit (6 octet) value. FIG. 7A further indicates the size in octets of each of the fields 710-770. The frame body field 765 comprises a variable number of octets (e.g., from 0 to 7951). Summing the value of all of the field sizes gives the overall size of the MAC header 702, which is 38 octets. The total size of a given MPDU may be on the order of 200 octets.

MPDU frames of different types may include only a portion of the fields shown in FIG. 7A. For example, if a MPDU frame is a control frame, the MAC header of the MPDU frame may not include the QoS control field 760 or the HT control field 760. In addition, depending on the type, the MPDU frame 700 may include additional fields. However, in some cases, regardless of the type, the MPDU frame 700 may include the frame control field 710.

Figure 7B:
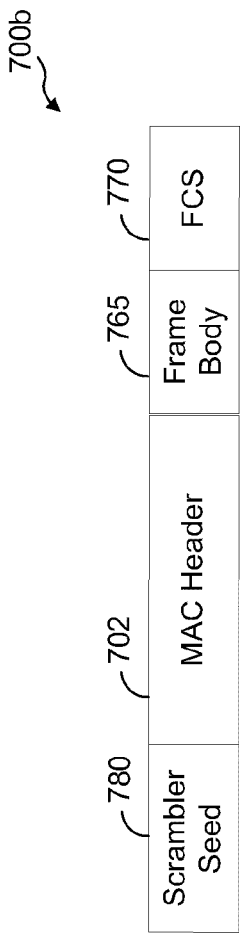
FIG. 7B shows an exemplary implementation of a media access control protocol data unit (MPDU) frame containing a scrambler seed.

FIG. 7B shows an exemplary implementation of a media access control protocol data unit (MPDU) frame 700b containing a scrambler seed 780. In this implementation, scrambler seed 780 is prepended to MAC header 702, thus advantageously allowing for a different scrambler seed for each MPDU.

Figure 8A:
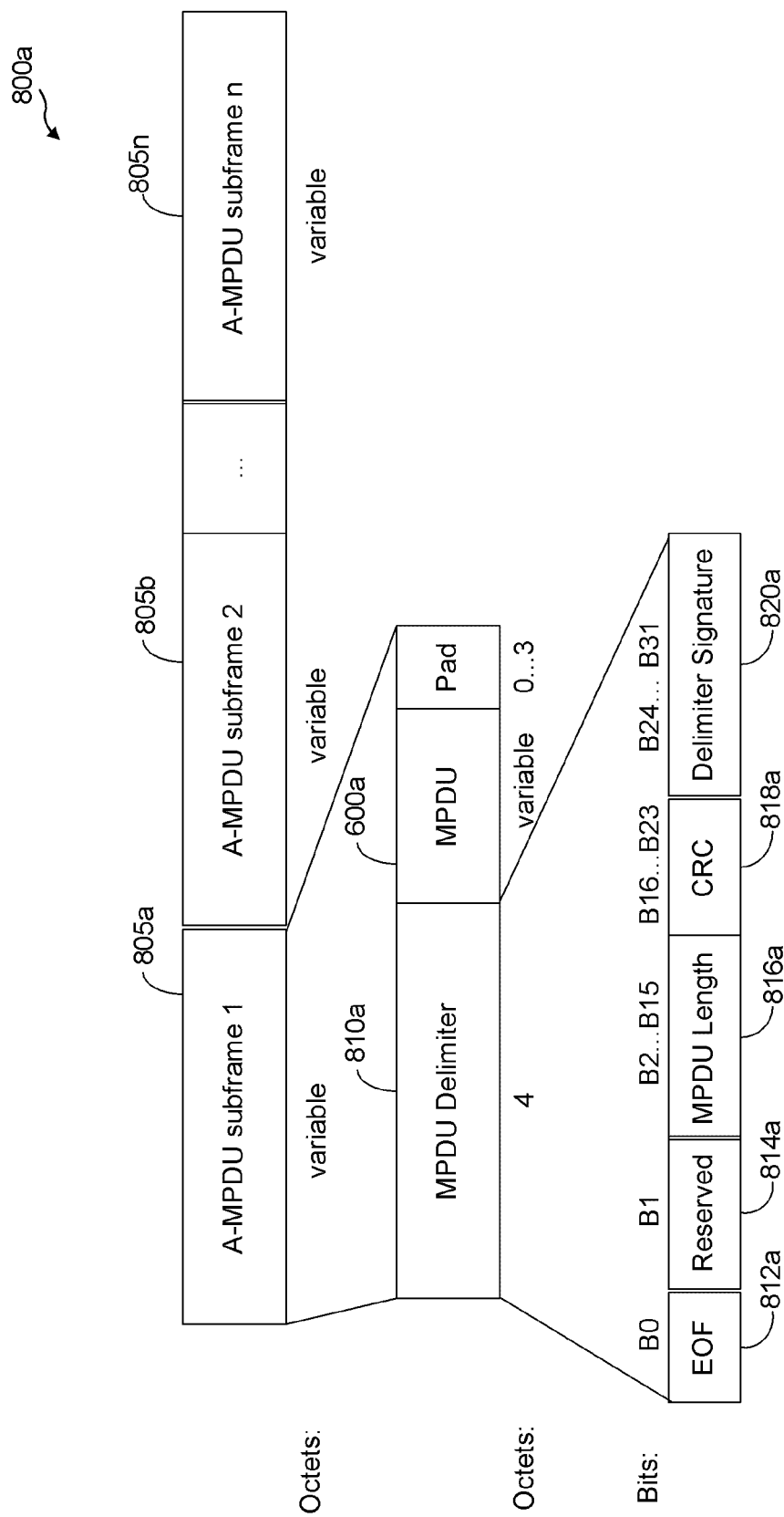
FIG. 8A shows an exemplary structure of an aggregated MPDU (A-MPDU) frame.

FIG. 8A shows an exemplary structure of an aggregated MPDU (A-MPDU) frame 800a. As shown, the A-MPDU frame 800a includes a variable number (n) of A-MPDU sub-frames, as shown 805a, 805b, and 805n. Each of the A-MPDU sub-frames 805a, 805b, and 805n may in some aspects be comprised of an MPDU delimiter field 810a, an MPDU frame 700a, and one or more pad bytes. The MPDU frame 700a may in some aspects conform substantially with the MPDU frame 700a illustrated in FIG. 7A. Each of the MPDU delimiter fields, for example, MPDU delimiter field 810a, may include an end of frame (EOF) field 812a, a reserved field 814a, an MPDU length field 817a, a CRC field 818a, and a delimiter signature field 820a.

Figure 8B:
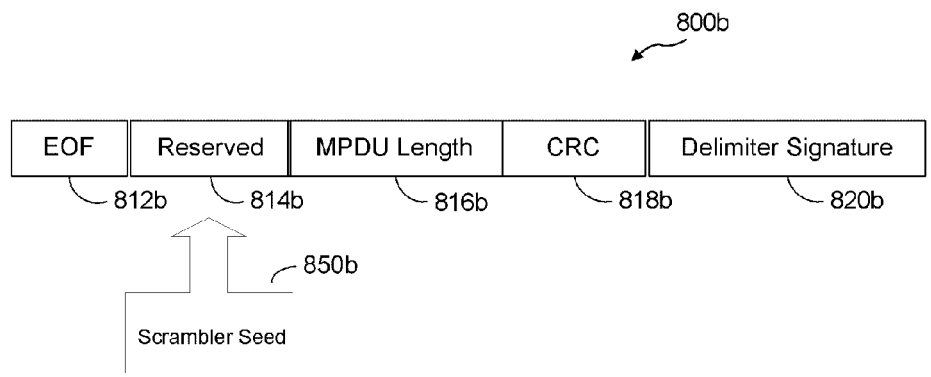
FIG. 8B shows an exemplary implementation of an MPDU delimiter field including a scrambler seed.

FIG. 8B shows an exemplary implementation of an MPDU delimiter field 800b including a scrambler seed 850b. In some implementations, MPDU delimiter field 800b can be created by DSP 220 of wireless device 202. As shown, scrambler seed 850b is included in the reserved bits 814b of MPDU delimiter field 800b. Advantageously, this implementation allows for different scrambler seeds for each MPDU, thus preventing the bottlenecking discussed in relation to data unit 500a.

Figure 8C:
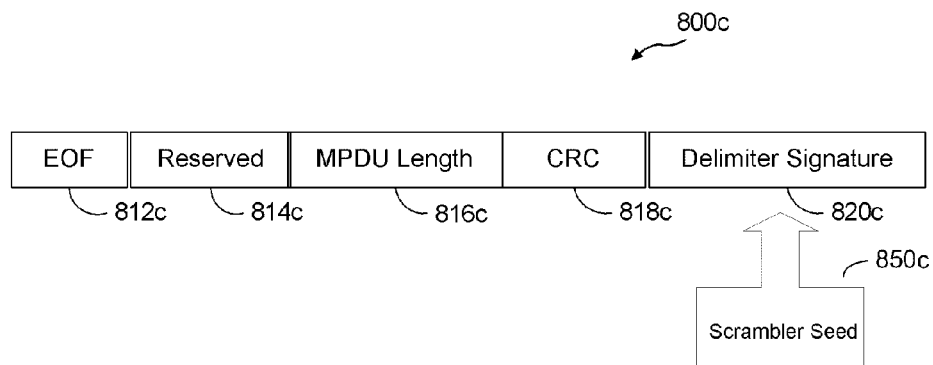
FIG. 8C shows another exemplary implementation of an MPDU delimiter field including a scrambler seed.

FIG. 8C shows another exemplary implementation of an MPDU delimiter field 800c including a scrambler seed 850c. In some implementations, MPDU delimiter field 800c can be created by DSP 220 of wireless device 202. As shown, scrambler seed 850c is included in the delimiter signature 820c of MPDU delimiter field 800c. Advantageously, this implementation allows for different scrambler seeds for each MPDU, thus preventing the bottlenecking discussed in relation to data unit 500a.

Figure 9:
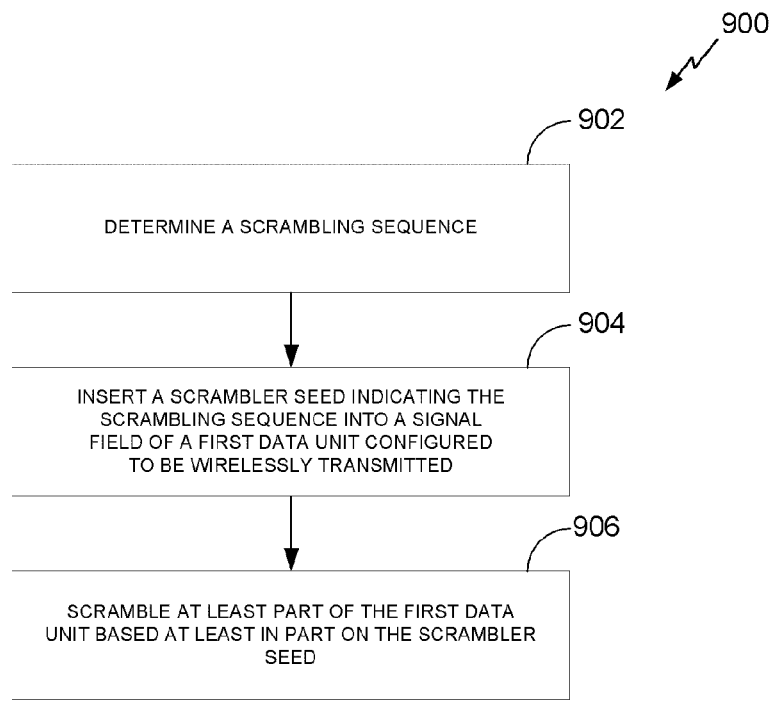
FIG. 9 shows a flow chart of an exemplary method that may be employed within the wireless communication system of FIG. 1.

FIG. 9 shows a flow chart of an exemplary method 900 that may be employed within the wireless device of FIG. 2. The method 900 can be implemented in whole or in part by the devices described herein, such as the wireless device 202 shown in FIG. 2. FIG. 9 may be performed at either AP 104 or STAs 106. Although the illustrated method 900 is described herein with reference to the wireless communication system 100 discussed above with respect to FIG. 1, and the wireless device 202 discussed in FIG. 2, a person having ordinary skill in the art will appreciate that the illustrated method 900 can be implemented by another device described herein, or any other suitable device. Although the illustrated method 900 is described herein with reference to a particular order, in various implementations, blocks herein may be performed in a different order, or omitted, and additional blocks may be added.

At block 902, a scrambling sequence is determined. At block 904, a scrambler seed indicating the scrambling sequence is inserted into a signal field of a first data unit configured to be wirelessly transmitted. For example, with reference to FIG. 6B, scrambler seed 650b is inserted into signal field 620b of data unit 600b. A processor such as SIG field scrambler seed processor 230 of FIG. 2 could perform such an insertion, although a person of ordinary skill in the art will appreciate that block 904 can be implemented by another device described herein, or any other suitable device.

At block 906, at least part of the data unit is scrambled based at least in part on the scrambler seed. For example, again with reference to FIG. 6B, data unit 600b is scrambled based at least in part on scrambler seed 650b. A processor such as SIG field scrambler seed processor 230 of FIG. 2 could perform such scrambling, although a person of ordinary skill in the art will appreciate that block 906 can be implemented by another device described herein, or any other suitable device.

Figure 10:
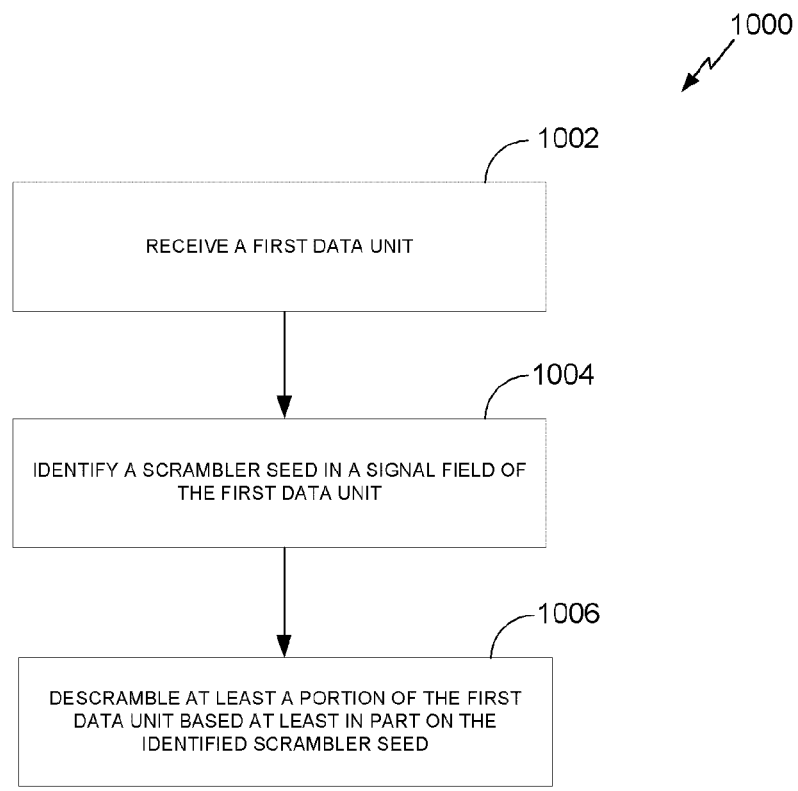
FIG. 10 shows a flow chart of another exemplary method that may be employed within the wireless device of FIG. 2.

FIG. 10 shows a flow chart of another exemplary method 1000 that may be employed within the wireless device of FIG. 2. The method 1000 can be implemented in whole or in part by the devices described herein, such as the wireless device 202 shown in FIG. 2. FIG. 10 may be performed at either AP 104 or STAs 106. Although the illustrated method 1000 is described herein with reference to the wireless communication system 100 discussed above with respect to FIG. 1, and the wireless device 202 discussed in FIG. 2, a person having ordinary skill in the art will appreciate that the illustrated method 1000 can be implemented by another device described herein, or any other suitable device. Although the illustrated method 1000 is described herein with reference to a particular order, in various implementations, blocks herein may be performed in a different order, or omitted, and additional blocks may be added.

At block 1002, an at least partly scrambled first data unit is received. A receiver such as receiver 212 of FIG. 2 could perform such a function, although a person of ordinary skill in the art will appreciate that block 1002 can be implemented by another device described herein, or any other suitable device.

At block 1004, a scrambler seed is identified in a signal field of the at least partly scrambled first data unit. For example, with reference to FIG. 6B, scrambler seed 650b is identified in signal field 620b of data unit 600b. A processor such as SIG field scrambler seed processor 230 of FIG. 2 could perform such an identification, although a person of ordinary skill in the art will appreciate that block 1004 can be implemented by another device described herein, or any other suitable device.

At block 1006, at least a portion of the at least partly scrambled first data unit is descrambled based at least in part on the identified scrambler seed. For example, with reference to FIG. 6B, at least part of data unit 600b is descrambled based at least in part on scrambler seed 650b. A processor such as SIG field scrambler seed processor 230 of FIG. 2 could perform such descrambling, although a person of ordinary skill in the art will appreciate that block 1006 can be implemented by another device described herein, or any other suitable device.

Figure 11:
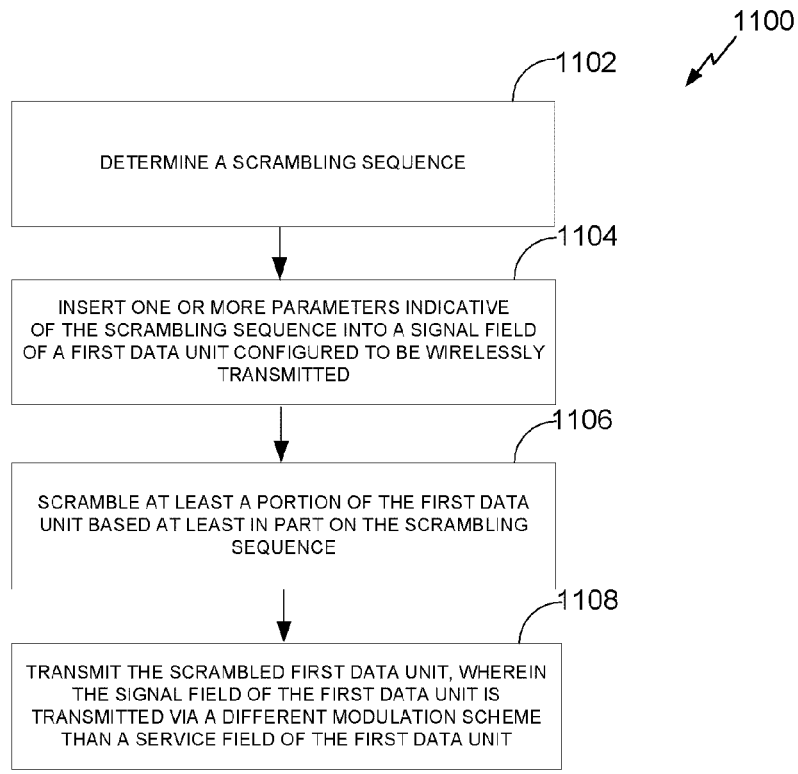
FIG. 11 shows a flow chart of yet another exemplary method that may be employed within the wireless device of FIG. 2.

FIG. 11 shows a flow chart of yet another exemplary method 1100 that may be employed within the wireless device of FIG. 2. The method 1100 can be implemented in whole or in part by the devices described herein, such as the wireless device 202 shown in FIG. 2. FIG. 11 may be performed at either AP 114 or STAs 116. Although the illustrated method 1100 is described herein with reference to the wireless communication system 110 discussed above with respect to FIG. 1, and the wireless device 202 discussed in FIG. 2, a person having ordinary skill in the art will appreciate that the illustrated method 1100 can be implemented by another device described herein, or any other suitable device. Although the illustrated method 1100 is described herein with reference to a particular order, in various implementations, blocks herein may be performed in a different order, or omitted, and additional blocks may be added.

At block 1102, a scrambler seed is determined. A processor such as DSP 220 of FIG. 2 could perform such a determination, although a person of ordinary skill in the art will appreciate that block 1102 can be implemented by another device described herein, or any other suitable device.

At block 1104, one or more parameters indicative of the scrambling sequence are inserted into a signal field of a first data unit configured to be wirelessly transmitted. For example, with reference to FIG. 6B, the one or more parameters may be utilized to indicate the scrambler seed 650b in signal field 620b of data unit 600b. A processor such as DSP 220 of FIG. 2 could perform such an insertion, although a person of ordinary skill in the art will appreciate that block 1104 can be implemented by another device described herein, or any other suitable device.

At block 1106 at least a portion of the first data unit is scrambled based at least in part on the scrambler seed determined in block 1102 and as indicated by the one or more parameters inserted in block 1104. For example, again with reference to FIG. 6B, data unit 600b is scrambled based at least in part on scrambler seed 650b. A processor such as DSP 220 of FIG. 2 could perform such scrambling, although a person of ordinary skill in the art will appreciate that block 1106 can be implemented by another device described herein, or any other suitable device.

At block 1108 the scrambled first data unit is transmitted, wherein the signal field of the data unit is transmitted via a different modulation scheme than is a service field of the first data unit (e.g., the signal field is transmitted at a lower data rate than the service field, or recited in reciprocal, the service field is transmitted at a higher data rate than the signal field). A transmitter such as transmitter 210 of FIG. 2 could perform such a function, although a person of ordinary skill in the art will appreciate that block 1320 can be implemented by another device described herein, or any other suitable device.

Figure 12:
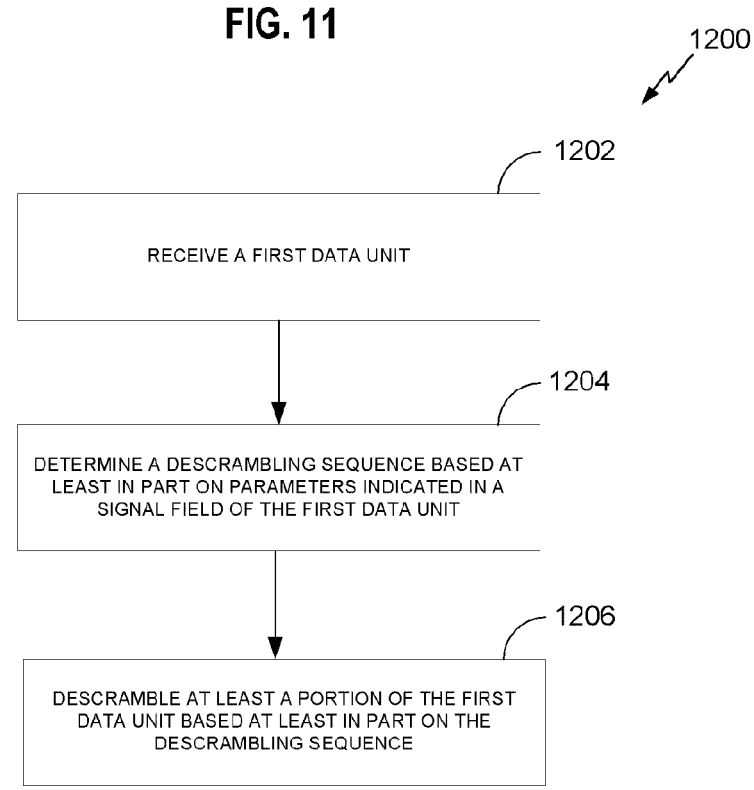
FIG. 12 shows a flow chart of yet another exemplary method that may be employed within the wireless device of FIG. 2.

FIG. 12 shows a flow chart of yet another exemplary method 1200 that may be employed within the wireless device of FIG. 2. The method 1200 can be implemented in whole or in part by the devices described herein, such as the wireless device 202 shown in FIG. 2. FIG. 12 may be performed at either AP 104 or STAs 106. Although the illustrated method 1200 is described herein with reference to the wireless communication system 100 discussed above with respect to FIG. 1, and the wireless device 202 discussed in FIG. 2, a person having ordinary skill in the art will appreciate that the illustrated method 1200 can be implemented by another device described herein, or any other suitable device. Although the illustrated method 1200 is described herein with reference to a particular order, in various implementations, blocks herein may be performed in a different order, or omitted, and additional blocks may be added.

At block 1202, an at least partly scrambled first data unit is received. A receiver such as receiver 212 of FIG. 2 could perform such a function, although a person of ordinary skill in the art will appreciate that block 1202 can be implemented by another device described herein, or any other suitable device.

At block 1204, a descrambler seed is determined based at least in part on one or more parameters indicated in a signal field of the at least partly scrambled first data unit. For example, with reference to FIG. 6B, scrambler seed 650b is determined based on one or more parameters indicated in signal field 620b of data unit 600b. A processor such as DSP 220 of FIG. 2 could perform such a determination, although a person of ordinary skill in the art will appreciate that block 1204 can be implemented by another device described herein, or any other suitable device.

At block 1206, at least a portion of the at least partly scrambled first data unit is descrambled based at least in part on the determined descrambler seed. For example, with reference to FIG. 6B, at least part of data unit 600b is descrambled based at least in part on scrambler seed 650b. A processor such as DSP 220 of FIG. 2 could perform such descrambling, although a person of ordinary skill in the art will appreciate that block 1206 can be implemented by another device described herein, or any other suitable device.

Figure 13:
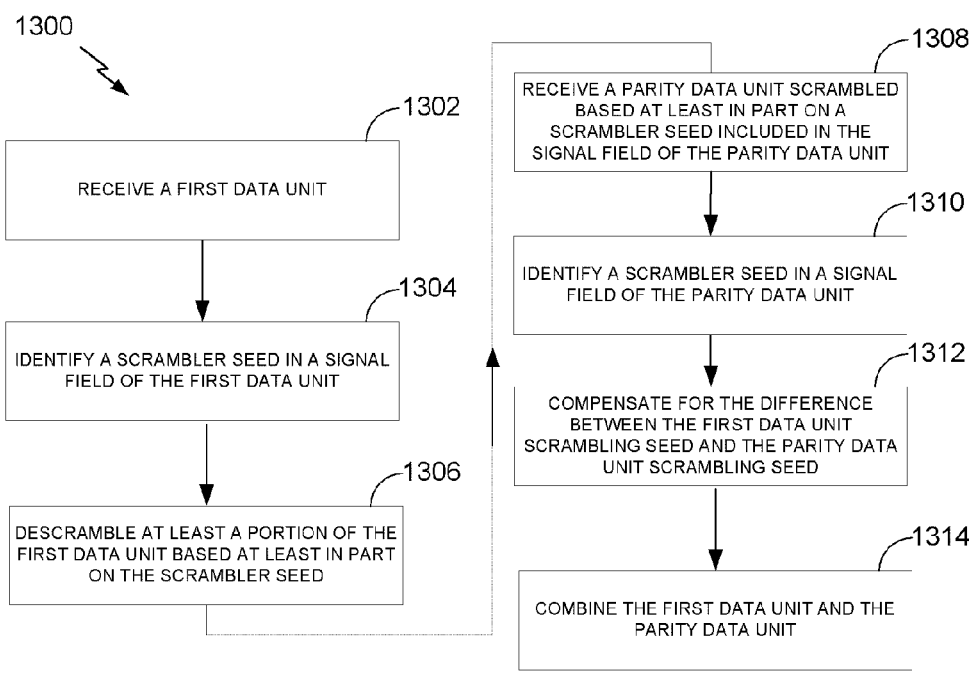
FIG. 13 shows a flow chart of yet another exemplary method that may be employed within the wireless device of FIG. 2.

FIG. 13 shows a flow chart of yet another exemplary method 1300 that may be employed within the wireless device of FIG. 2. The method 1300 can be implemented in whole or in part by the devices described herein, such as the wireless device 202 shown in FIG. 2. FIG. 13 may be performed at either AP 104 or STAs 106. Although the illustrated method 1300 is described herein with reference to the wireless communication system 100 discussed above with respect to FIG. 1, and the wireless device 202 discussed in FIG. 2, a person having ordinary skill in the art will appreciate that the illustrated method 1300 can be implemented by another device described herein, or any other suitable device. Although the illustrated method 1300 is described herein with reference to a particular order, in various implementations, blocks herein may be performed in a different order, or omitted, and additional blocks may be added.

First, at block 1302, an at least partly scrambled first data unit is received. A receiver such as receiver 212 of FIG. 2 could perform such a function, although a person of ordinary skill in the art will appreciate that block 1302 can be implemented by another device described herein, or any other suitable device.

Next, at block 1304, a scrambler seed is identified in a signal field of the at least partly scrambled first data unit. For example, with reference to FIG. 6B, scrambler seed 650b is identified in signal field 620b of data unit 600b. A processor such as SIG field scrambler seed processor 230 of FIG. 2 could perform such an identification, although a person of ordinary skill in the art will appreciate that block 1304 can be implemented by another device described herein, or any other suitable device.

Next, at block 1306, at least a portion of the at least partly scrambled first data unit is descrambled based at least in part on the identified scrambler seed. For example, with reference to FIG. 6B, at least a portion of data unit 600*b* is descrambled based at least in part on scrambler seed 650*b*. A processor such as SIG field scrambler seed processor 230 of FIG. 2 could perform such descrambling, although a person of ordinary skill in the art will appreciate that block 1306 can be implemented by another device described herein, or any other suitable device.

At block 1308, a parity data unit is received that is scrambled based at least in part on a scrambler seed included in the signal field of the parity data unit. A receiver such as receiver 212 of FIG. 2 could perform such a function, although a person of ordinary skill in the art will appreciate that block 1308 can be implemented by another device described herein, or any other suitable device.

At block 1310, a scrambler seed is identified in a signal field of the parity data unit. For example, with reference to FIG. 6B, scrambler seed 650*b* is identified in signal field 620*b* of data unit 600*b*. A processor such as SIG field scrambler seed processor 230 of FIG. 2 could perform such an identification, although a person of ordinary skill in the art will appreciate that block 1310 can be implemented by another device described herein, or any other suitable device.

At block 1312, compensation occurs for the difference of the first data unit scrambler seed and the parity data unit scrambler seed. In an implementation, compensation comprises changing the signs of the stored data values at the receiver based on the difference of the first data unit scrambler seed and the parity data unit scrambler seed. A processor such as SIG field scrambler seed processor 230 of FIG. 2 could perform such a compensation, although a person of ordinary skill in the art will appreciate that block 1312 can be implemented by another device described herein, or any other suitable device.

At block 1314, the first data unit and the parity data unit are combined. The result of block 1314 should indicate whether the information in the first data unit was transmitted accurately. A processor such as SIG field scrambler seed processor 230 of FIG. 2 could perform such combining, although a person of ordinary skill in the art will appreciate that block 1314 can be implemented by another device described herein, or any other suitable device.

Figure 14:
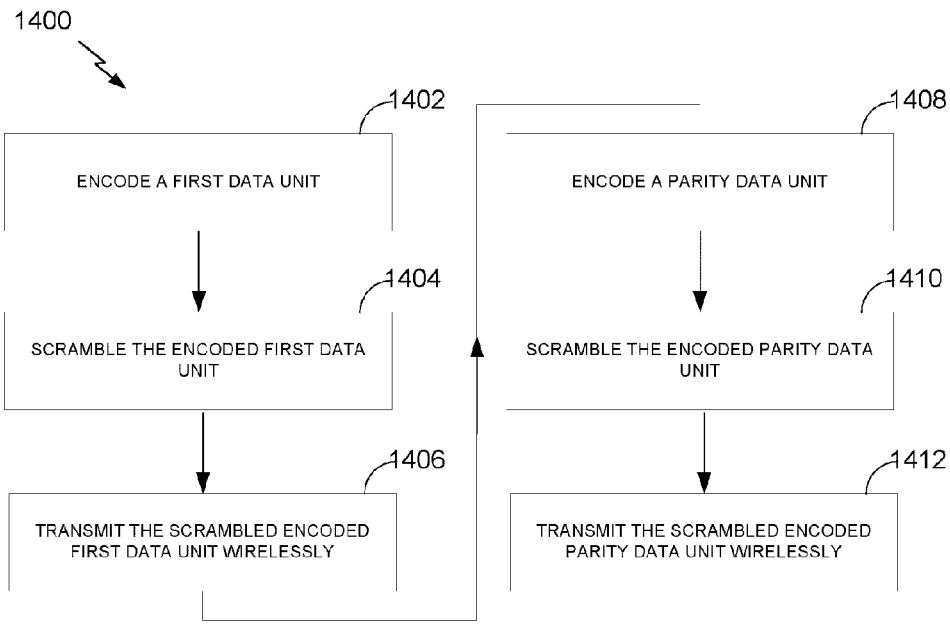
FIG. 14 shows a flow chart of yet another exemplary method that may be employed within the wireless device of FIG. 2.

FIG. 14 shows a flow chart of yet another exemplary method 1400 that may be employed within the wireless device of FIG. 2. The method 1400 can be implemented in whole or in part by the devices described herein, such as the wireless device 202 shown in FIG. 2. FIG. 14 may be performed at either AP 104 or STAs 106. Although the illustrated method 1400 is described herein with reference to the wireless communication system 100 discussed above with respect to FIG. 1, and the wireless device 202 discussed in FIG. 2, a person having ordinary skill in the art will appreciate that the illustrated method 1400 can be implemented by another device described herein, or any other suitable device. Although the illustrated method 1400 is described herein with reference to a particular order, in various implementations, blocks herein may be performed in a different order, or omitted, and additional blocks may be added. In some implementations, method 1400 is advantageous as it allows for the direct combining of first data units and parity data units in an attempt to recover wrongly decoded data. In some implementations, method 1400 overcomes problems with directly combining first data units and parity data units arising due to the data units being scrambled with different sequences prior to encoding.

First, at block 1402, a first data unit is encoded. A processor such as DSP 220 of FIG. 2 could perform such encoding, as could encoder 520C of FIG. 5C, although a person of ordinary skill in the art will appreciate that block 1402 can be implemented by another device described herein, or any other suitable device.

Next, at block 1404, the encoded first data unit is scrambled. Block 1404 must occur after block 1402. A processor such as DSP 220 of FIG. 2 could perform such scrambling, as could scrambler 510C of FIG. 5C, although a person of ordinary skill in the art will appreciate that block 1404 can be implemented by another device described herein, or any other suitable device.

Next, at block 1406, the scrambled encoded first data unit is transmitted wirelessly. A transmitter such as transmitter 210 of FIGS. 2 and 5C could perform such a function, although a person of ordinary skill in the art will appreciate that block 1406 can be implemented by another device described herein, or any other suitable device.

Next, at block 1408, a parity data unit is encoded. A processor such as DSP 220 of FIG. 2 could perform such encoding, as could encoder 520C of FIG. 5C, although a person of ordinary skill in the art will appreciate that block 1408 can be implemented by another device described herein, or any other suitable device.

Next, at block 1410, the encoded parity data unit is scrambled. Block 1410 must occur after block 1408. A processor such as DSP 220 of FIG. 2 could perform such scrambling, as could scrambler 510C of FIG. 5C, although a person of ordinary skill in the art will appreciate that block 1410 can be implemented by another device described herein, or any other suitable device.

Next, at block 1412, the scrambled encoded parity data unit is transmitted wirelessly. A transmitter such as transmitter 210 of FIGS. 2 and 5C could perform such a function, although a person of ordinary skill in the art will appreciate that block 1406 can be implemented by another device described herein, or any other suitable device.

Figure 15:
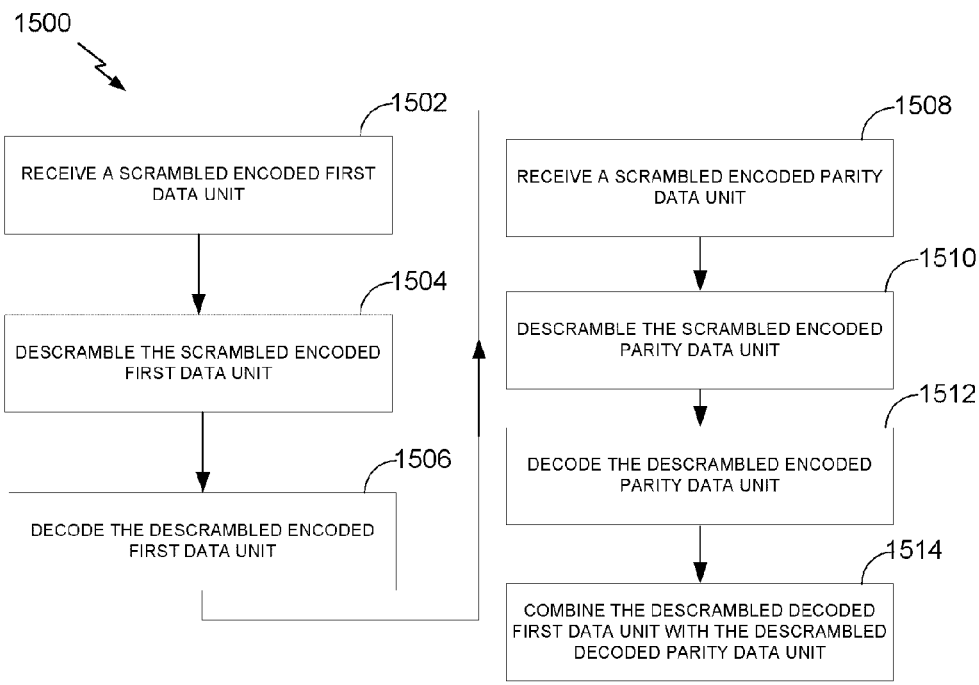
FIG. 15 shows a flow chart of yet another exemplary method that may be employed within the wireless device of FIG. 2.

FIG. 15 shows a flow chart of yet another exemplary method 1500 that may be employed within the wireless device of FIG. 2. The method 1500 can be implemented in whole or in part by the devices described herein, such as the wireless device 202 shown in FIG. 2. FIG. 15 may be performed at either AP 104 or STAs 106. Although the illustrated method 1500 is described herein with reference to the wireless communication system 100 discussed above with respect to FIG. 1, and the wireless device 202 discussed in FIG. 2, a person having ordinary skill in the art will appreciate that the illustrated method 1500 can be implemented by another device described herein, or any other suitable device. Although the illustrated method 1500 is described herein with reference to a particular order, in various implementations, blocks herein may be performed in a different order, or omitted, and additional blocks may be added. In some implementations, method 1500 is advantageous as it allows for the direct combining of primary data units and parity data units in an attempt to recover wrongly decoded data. In some implementations, method 1500 overcomes problems with directly combining primary data units and parity data units arising due to the data units being scrambled with different sequences prior to encoding.

First, at block 1502, a scrambled encoded primary data unit is received. A receiver such as receiver 212 of FIGS. 2 and 5D could perform such a function, although a person of ordinary skill in the art will appreciate that block 1502 can be implemented by another device described herein, or any other suitable device.

Next, at block 1504, the scrambled encoded primary data unit is descrambled. A processor such as DSP 220 of FIG. 2 could perform such descrambling, as could descrambler 510D of FIG. 5D, although a person of ordinary skill in the art will appreciate that block 1504 can be implemented by another device described herein, or any other suitable device.

Next, at block 1506, the descrambled encoded primary data unit is decoded. A processor such as DSP 220 of FIG. 2 could perform such decoding, as could decoder 520D of FIG. 5D, although a person of ordinary skill in the art will appreciate that block 1506 can be implemented by another device described herein, or any other suitable device.

Next, at block 1508, a scrambled encoded parity data unit is received. A receiver such as receiver 212 of FIGS. 2 and 5D could perform such a function, although a person of ordinary skill in the art will appreciate that block 1508 can be implemented by another device described herein, or any other suitable device.

Next, at block 1510, the scrambled encoded parity data unit is descrambled. A processor such as DSP 220 of FIG. 2 could perform such descrambling, as could descrambler 510D of FIG. 5D, although a person of ordinary skill in the art will appreciate that block 1510 can be implemented by another device described herein, or any other suitable device.

Next, at block 1512, the descrambled encoded parity data unit is decoded. A processor such as DSP 220 of FIG. 2 could perform such decoding, as could decoder 520D of FIG. 5D, although a person of ordinary skill in the art will appreciate that block 1512 can be implemented by another device described herein, or any other suitable device.

Next, at block 1514, the descrambled decoded primary data unit is combined with the descrambled decoded parity data unit. A processor such as DSP 220 of FIG. 2 could perform such combining, as could combiner 530D of FIG. 5D, although a person of ordinary skill in the art will appreciate that block 1514 can be implemented by another device described herein, or any other suitable device.

Figure 16:
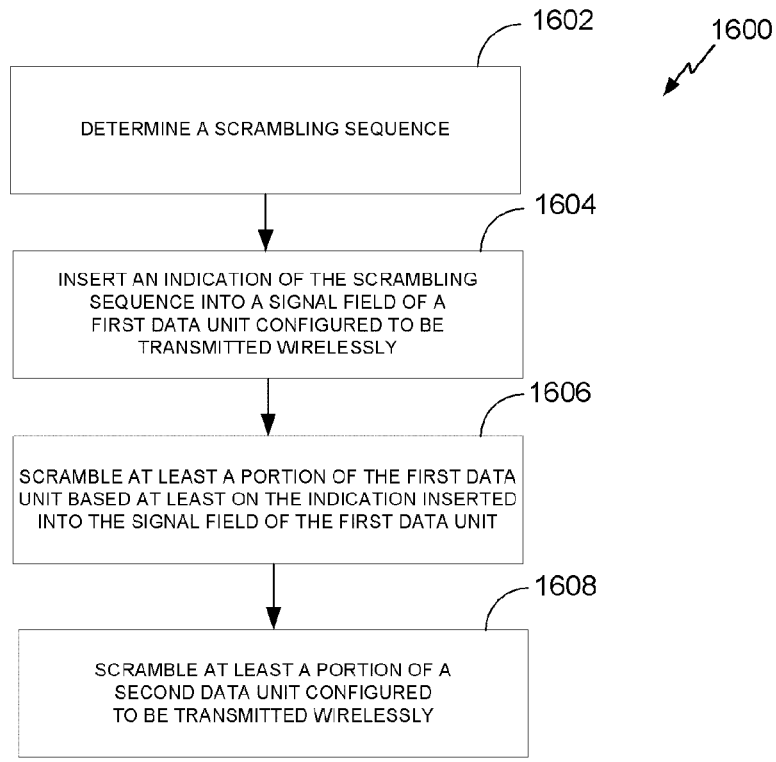
FIG. 16 shows a flow chart of yet another exemplary method that may be employed within the wireless device of FIG. 2.

FIG. 16 shows a flow chart of yet another exemplary method 1600 that may be employed within the wireless device of FIG. 2. The method 1600 can be implemented in whole or in part by the devices described herein, such as the wireless device 202 shown in FIG. 2. FIG. 16 may be performed at either AP 104 or STAs 106. Although the illustrated method 1600 is described herein with reference to the wireless communication system 100 discussed above with respect to FIG. 1, and the wireless device 202 discussed in FIG. 2, a person having ordinary skill in the art will appreciate that the illustrated method 1600 can be implemented by another device described herein, or any other suitable device. Although the illustrated method 1600 is described herein with reference to a particular order, in various implementations, blocks herein may be performed in a different order, or omitted, and additional blocks may be added.

At block 1602, a scrambling sequence may be determined. In some implementations, the scrambling sequence is fixed, for example according to a technical standard or access point. In some implementations, the scrambling sequence is random. In yet other implementations, as will be described in more detail in connection with FIGS. 18 and 19, the scrambling sequence may be determined based at least in part on a timing relative to when the first data unit is transmitted. For example, in some implementations, the AP 104 or STAs 106 may determine what scrambling sequence to utilize based on a timing of transmission of the first data unit relative to a start or end of a beacon interval (i.e., the interval between successive beacon transmissions).

At block 1604, an indication of the scrambling sequence is inserted into a signal field of a first data unit configured to be transmitted wirelessly. For example in some implementations, with reference to FIG. 6B, a scrambler seed 650*b* indicating the scrambling sequence is inserted into the signal field 620*b* of data unit 600*b*. In some other implementations, the indication may comprise one or more parameters indicating the scrambling sequence. A processor such as DSP 220 of FIG. 2 could perform the insertion carried out at block 1602, although a person of ordinary skill in the art will appreciate that block 1602 can be implemented by another device described herein, or any other suitable device.

At block 1606, at least a portion of the first data unit is scrambled based at least on the indication inserted into the signal field of the first data unit. In one implementation, with reference to FIG. 6B, at least a portion of the data unit 600*b* is scrambled based at least on scrambler seed 650*b*. A processor such as DSP 220 of FIG. 2 could perform the scrambling carried out at block 1606, although a person of ordinary skill in the art will appreciate that block 1606 can be implemented by another device described herein, or any other suitable device.

At block 1608, at least a portion of a second data unit is scrambled, the second data unit being configured to be transmitted wirelessly. In some implementations, the second data unit is scrambled based at least the indication of the scrambling sequence inserted into the first data unit. In some other implementations, the second data unit is scrambled based at least on an indication of a scrambling sequence inserted into the second data unit. In some implementations, the second data unit comprises a retransmission of the first data unit. In some implementations the second data unit comprises a parity data unit, the parity data unit being associated with the first data unit. A processor such as DSP 220 of FIG. 2 could perform the scrambling carried out at block 1608, although a person of ordinary skill in the art will appreciate that block 1608 can be implemented by another device described herein, or any other suitable device.

Figure 17:
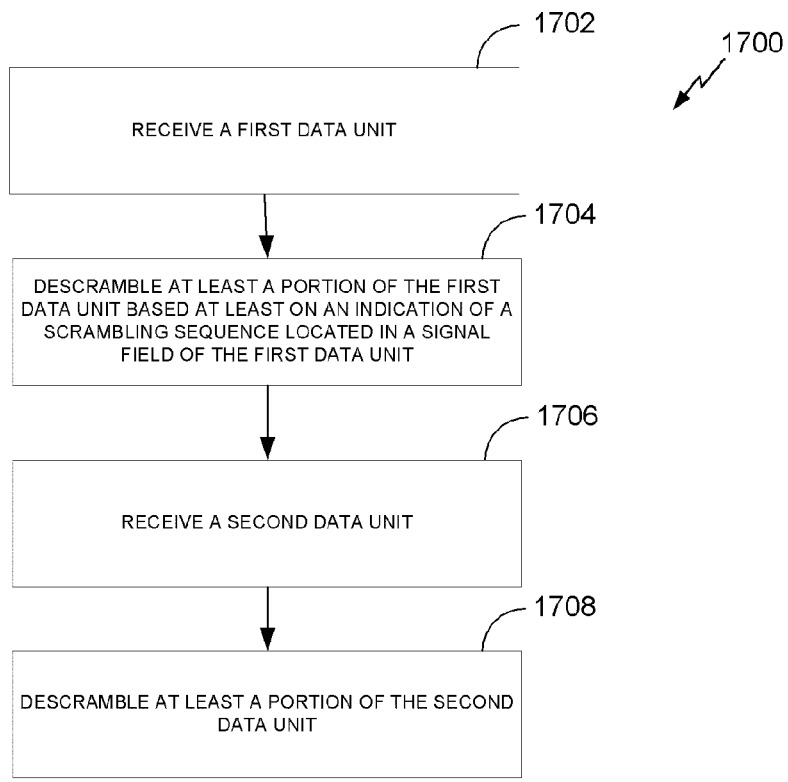
FIG. 17 shows a flow chart of yet another exemplary method that may be employed within the wireless device of FIG. 2.

FIG. 17 shows a flow chart of yet another exemplary method 1700 that may be employed within the wireless device of FIG. 2. The method 1700 can be implemented in whole or in part by the devices described herein, such as the wireless device 202 shown in FIG. 2. Exemplary method 1700 may be performed at either AP 104 or STAs 106. Although the illustrated method 1700 is described herein with reference to the wireless communication system 100 discussed above with respect to FIG. 1, and the wireless device 202 discussed in FIG. 2, a person having ordinary skill in the art will appreciate that the illustrated method 1700 can be implemented by another device described herein, or any other suitable device. Although the illustrated method 1700 is described herein with reference to a particular order, in various implementations, blocks herein may be performed in a different order, or omitted, and additional blocks may be added.

At block 1702, an at least partly scrambled first data unit is received wirelessly. A receiver such as receiver 212 of FIG. 2 could perform such a function, although a person of ordinary skill in the art will appreciate that block 1702 can be implemented by another device described herein, or any other suitable device. In one implementation, with reference to FIG. 6B, data unit 600*b* is a first data unit.

At block 1704, at least a portion of the at least partly scrambled first data unit is descrambled based at least on an indication of a scrambling sequence located in a signal field of the first data unit. In one implementation, with reference to FIG. 6B, data unit 600*b* is descrambled based on scrambler seed 650*b*. In some other implementations, the data unit may be descrambled based on one or more parameters indicating the scrambling sequence inserted the signal field. A processor such as DSP 220 of FIG. 2 could perform the descrambling carried out at block 1704, although a person of ordinary skill in the art will appreciate that block 1704 can be implemented by another device described herein, or any other suitable device.

At block 1706, an at least partly scrambled second data unit is received wirelessly. A receiver such as receiver 212 of FIG. 2 could perform such a function, although a person of ordinary skill in the art will appreciate that block 1706 can be implemented by another device described herein, or any other suitable device. In some implementations, the second data unit comprises a retransmission of the first data unit. In some implementations the second data unit comprises a parity transmission, the parity transmission being associated with the first data unit.

At block 1708, at least a portion of the at least partly scrambled second data unit is descrambled. In some implementations, the descrambling may be based at least on the scrambler seed or indication of the scrambling sequence located in the signal field of the first data unit. In some other implementations, the descrambling may be based at least on a scrambler seed or indication of the scrambling sequence inserted in a signal field of the second data unit. A processor such as DSP 220 of FIG. 2 could perform the descrambling carried out at block 1708, although a person of ordinary skill in the art will appreciate that block 1708 can be implemented by another device described herein, or any other suitable device.

Figure 18:
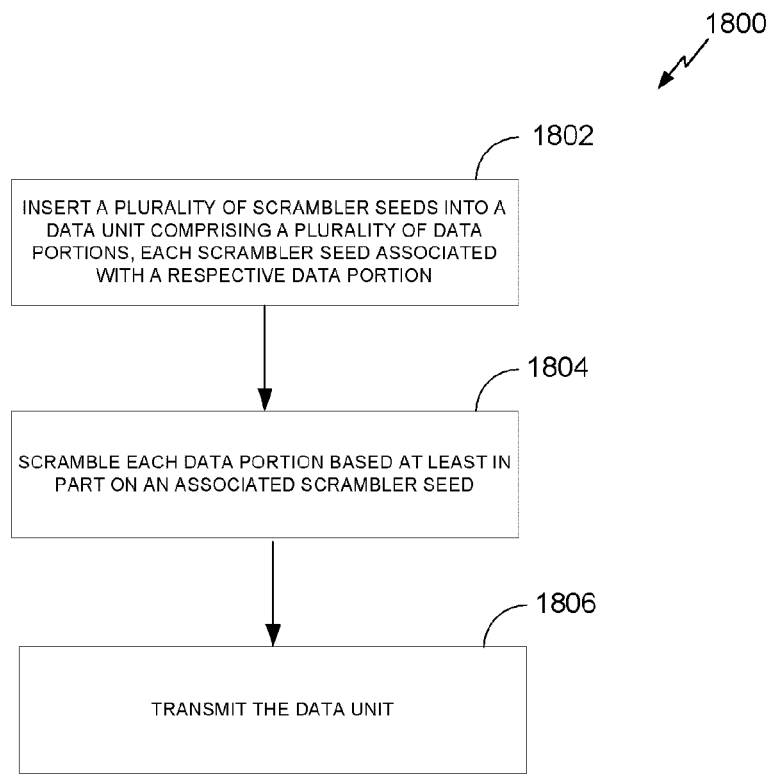
FIG. 18 shows a flow chart of yet another exemplary method that may be employed within the wireless device of FIG. 2.

FIG. 18 shows a flow chart of yet another exemplary method 1800 that may be employed within the wireless device of FIG. 2. The method 1800 can be implemented in whole or in part by the devices described herein, such as the wireless device 202 shown in FIG. 2. FIG. 18 may be performed at either AP 104 or STAs 106. Although the illustrated method 1800 is described herein with reference to the wireless communication system 100 discussed above with respect to FIG. 1, and the wireless device 202 discussed in FIG. 2, a person having ordinary skill in the art will appreciate that the illustrated method 1800 can be implemented by another device described herein, or any other suitable device. Although the illustrated method 1800 is described herein with reference to a particular order, in various implementations, blocks herein may be performed in a different order, or omitted, and additional blocks may be added.

At block 1802, a plurality of scrambler seeds are inserted into a data unit comprising a plurality of data portions, each scrambler seed associated with a respective data portion. In one implementation, with reference to FIG. 6C, scrambler seeds (650*c*1, 650*c*2, 650*c*N) are inserted into data unit 600*c* before the code word/data field (640*c*1, 640*c*2, 640*c*N) they are each respectively associated with. In this implementation, a data portion is comprised of each code word/data field (640*c*1, 640*c*2, 640*c*N). In another implementation, with reference to FIG. 8A, each particular MPDU frame 700*a* of A-MPDU 800*a* can have an associated scrambler seed inserted, such as is reflected in FIG. 7B with MPDU 700*b* having its MAC Header 702 prepended by scrambler seed 780. In this implementation, a data portion is comprised of each MPDU frame 700*a*. In another implementation, with reference to FIG. 8A, each A-MPDU subframe (805*a*, 805*b*, 805*n*) can have an associated scrambler seed inserted, such as is reflected in FIG. 8B with MPDU delimiter field 800*b* having scrambler seed 850*b* inserted into reserved bits 814*b*, and as is reflected in FIG. 8C with MPDU delimiter field 800*c* having scrambler seed 850*c* inserted into delimiter signature 820*c*. In this implementation, a data portion is comprised of each MPDU frame 700*a*. A processor such as DSP 220 of FIG. 2 could perform the insertion carried out at block 1802, although a person of ordinary skill in the art will appreciate that block 1802 can be implemented by another device described herein, or any other suitable device.

At block 1804, each data portion is scrambled based at least in part on an associated scrambler seed. In one implementation, with reference to FIG. 6C, code words/data fields (640*c*1, 640*c*2, 640*c*N) are scrambled at least in part based on their respectively associated scrambler seeds (650*c*1, 650*c*2, 650*c*N). In another implementation, with reference to FIG. 7B, each MPDU frame 700*b* is scrambled based on a scrambler seed 780. In another implementation, with reference to FIGS. 8A and 8B, each MPDU frame 700*a* is scrambled based on its associated scrambler seed 850*b*. In another implementation, with reference to FIGS. 8A and 8C, each MPDU frame 700*a* is scrambled based on its associated scrambler seed 850*c*. A processor such as DSP 220 of FIG. 2 could perform the scrambling carried out at block 1804, although a person of ordinary skill in the art will appreciate that block 1804 can be implemented by another device described herein, or any other suitable device.

At block 1806, the data unit is transmitted. A transmitter such as transmitter 210 of FIG. 2 could perform such a function, although a person of ordinary skill in the art will appreciate that block 1806 can be implemented by another device described herein, or any other suitable device.

Figure 19:
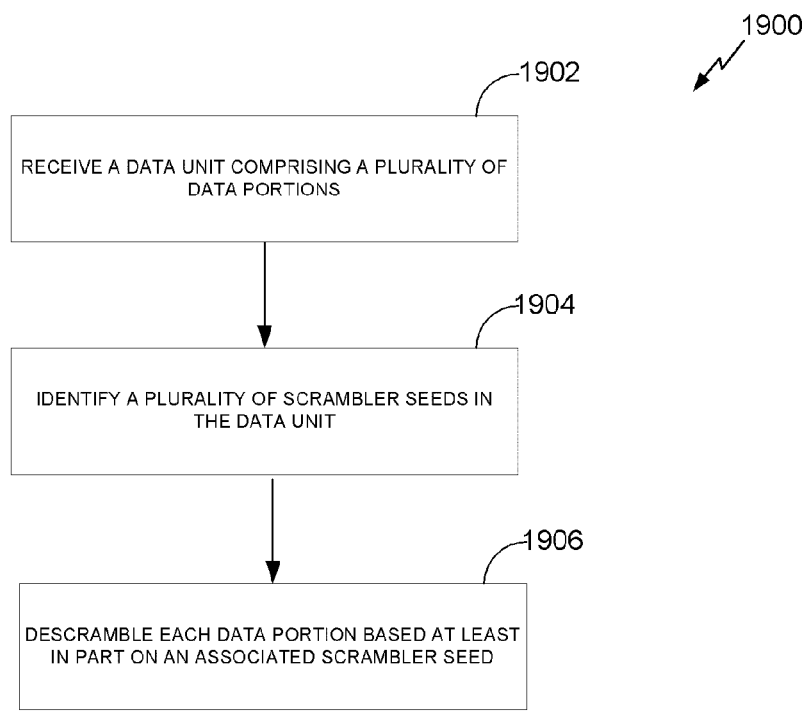
FIG. 19 shows a flow chart of yet another exemplary method that may be employed within the wireless device of FIG. 2.

FIG. 19 shows a flow chart of yet another exemplary method 1900 that may be employed within the wireless device of FIG. 2. The method 1900 can be implemented in whole or in part by the devices described herein, such as the wireless device 202 shown in FIG. 2. FIG. 19 may be performed at either AP 104 or STAs 106. Although the illustrated method 1900 is described herein with reference to the wireless communication system 100 discussed above with respect to FIG. 1, and the wireless device 202 discussed in FIG. 2, a person having ordinary skill in the art will appreciate that the illustrated method 1900 can be implemented by another device described herein, or any other suitable device. Although the illustrated method 1900 is described herein with reference to a particular order, in various implementations, blocks herein may be performed in a different order, or omitted, and additional blocks may be added.

At block 1902, a data unit comprising a plurality of data portions is received. In one implementation, with reference to FIG. 6C, data unit 600*c* is comprised of a plurality of data portions in the form of code words/data fields (640*c*1, 640*c*2, 640*c*N). In another implementation, with reference to FIG. 8A, A-MPDU frame 800*a* is comprised of a plurality of data portions in the form of MPDU frames 700*a*. A receiver such as receiver 212 of FIG. 2 could perform such a function, although a person of ordinary skill in the art will appreciate that block 1902 can be implemented by another device described herein, or any other suitable device.

At block 1904, a plurality of scrambler seeds are identified in the data unit. In one implementation, with reference to FIG. 6C, scrambler seeds (650*c*1, 650*c*2, 650*c*N) are identified. In another implementation, with reference to FIG. 7B, scrambler seed 780 is identified for each MPDU 700*b*. In another implementation, with reference to FIG. 8B, scrambler seed 850*b* is identified for each MPDU. In another implementation, with reference to FIG. 8C, scrambler seed 850*c* is identified for each MPDU. A processor such as DSP 220 of FIG. 2 could perform the identification carried out at block 1904, although a person of ordinary skill in the art will appreciate that block 1904 can be implemented by another device described herein, or any other suitable device.

At block 1906, each data portion is descrambled based at least in part on an associated scrambler seed. In one implementation, with reference to FIG. 6C, code words/data fields (640*c*1, 640*c*2, 640*c*N) are descrambled at least in part based on their respectively associated scrambler seeds (650*c*1, 650*c*2, 650*c*N). In another implementation, with reference to FIG. 7B, each MPDU frame 700*b* is descrambled based on a scrambler seed 780. In another implementation, with reference to FIGS. 8A and 8B, each MPDU frame 700*a* is descrambled based on its associated scrambler seed 850*b*. In another implementation, with reference to FIGS. 8A and 8C, each MPDU frame 700*a* is descrambled based on its associated scrambler seed 850*c*. A processor such as DSP 220 of FIG. 2 could perform the descrambling carried out at block 1906, although a person of ordinary skill in the art will appreciate that block 1906 can be implemented by another device described herein, or any other suitable device.

Figure 20:
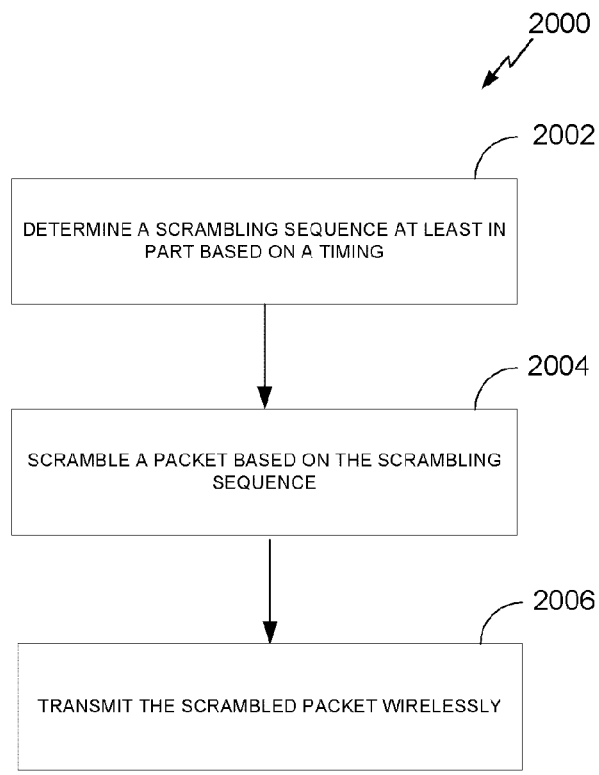
FIG. 20 shows a flow chart of yet another exemplary method that may be employed within the wireless device of FIG. 2.

FIG. 20 shows a flow chart of yet another exemplary method 2000 that may be employed within the wireless device of FIG. 2. The method 2000 can be implemented in whole or in part by the devices described herein, such as the wireless device 202 shown in FIG. 2. FIG. 20 may be performed at either AP 104 or STAs 106. Although the illustrated method 2000 is described herein with reference to the wireless communication system 100 discussed above with respect to FIG. 1, and the wireless device 202 discussed in FIG. 2, a person having ordinary skill in the art will appreciate that the illustrated method 2000 can be implemented by another device described herein, or any other suitable device. Although the illustrated method 2000 is described herein with reference to a particular order, in various implementations, blocks herein may be performed in a different order, or omitted, and additional blocks may be added.

First, at block 2002, a scrambler seed is determined at least in part based on a timing. In some implementations, a timing is comprised of a timing of a beacon interval. In some implementations, a timing is comprised of a timing relative to when the packet is transmitted. A processor such as DSP 220 of FIG. 2 could perform the determination carried out at block 2002, although a person of ordinary skill in the art will appreciate that block 2002 can be implemented by another device described herein, or any other suitable device.

Next, at block 2004, a packet is scrambled based on the scrambler seed determined in block 2002. A processor such as DSP 220 of FIG. 2 could perform the scrambling carried out at block 2004, although a person of ordinary skill in the art will appreciate that block 2004 can be implemented by another device described herein, or any other suitable device.

Next, at block 2006, the scrambled packet is transmitted wirelessly. A transmitter such as transmitter 210 of FIG. 2 could perform such a function, although a person of ordinary skill in the art will appreciate that block 2006 can be implemented by another device described herein, or any other suitable device.

Figure 21:
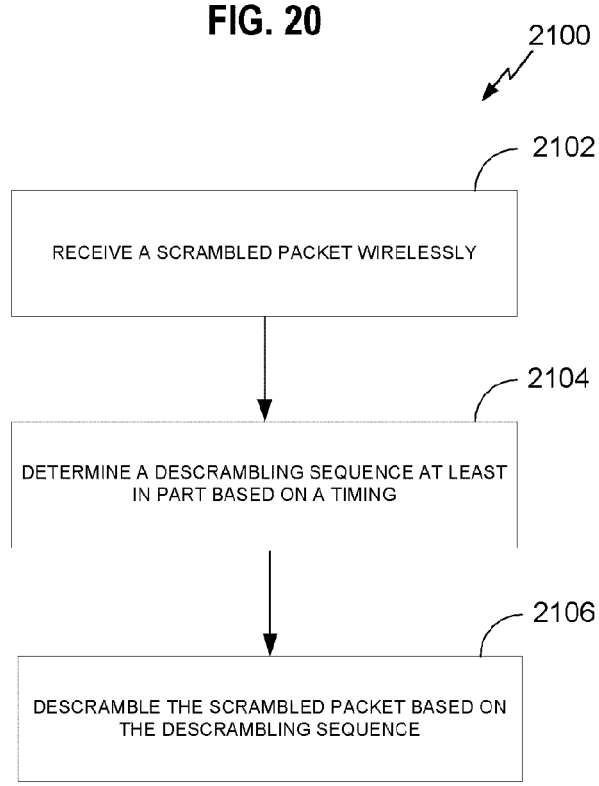
FIG. 21 shows a flow chart of yet another exemplary method that may be employed within the wireless device of FIG. 2.

FIG. 21 shows a flow chart of yet another exemplary method 2100 that may be employed within the wireless device of FIG. 2. The method 2100 can be implemented in whole or in part by the devices described herein, such as the wireless device 202 shown in FIG. 2. FIG. 21 may be performed at either AP 104 or STAs 106. Although the illustrated method 2100 is described herein with reference to the wireless communication system 100 discussed above with respect to FIG. 1, and the wireless device 202 discussed in FIG. 2, a person having ordinary skill in the art will appreciate that the illustrated method 2100 can be implemented by another device described herein, or any other suitable device. Although the illustrated method 2100 is described herein with reference to a particular order, in various implementations, blocks herein may be performed in a different order, or omitted, and additional blocks may be added.

First, at block 2102, a scrambled packet is wirelessly received. A receiver such as receiver 212 of FIG. 2 could perform such a function, although a person of ordinary skill in the art will appreciate that block 2102 can be implemented by another device described herein, or any other suitable device.

Next, at block 2104, a descrambler seed is determined at least in part based on a timing. In some implementations, a timing is comprised of a timing of a beacon interval. In some implementations, a timing is comprised of a timing relative to when the packet is transmitted. A processor such as DSP 220 of FIG. 2 could perform the determination carried out at block 2104, although a person of ordinary skill in the art will appreciate that block 2104 can be implemented by another device described herein, or any other suitable device.

Next, at block 2106, the scrambled packet is descrambled based on the descrambler seed determined in block 2104. A processor such as DSP 220 of FIG. 2 could perform the descrambling carried out at block 2106, although a person of ordinary skill in the art will appreciate that block 2106 can be implemented by another device described herein, or any other suitable device.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communication, comprising:
inserting a plurality of scrambler seeds into a data unit comprising a plurality of data portions comprising at least one media access control protocol data unit, the at least one media access control protocol data unit including a delimiter field, and at least one of the plurality of scrambler seeds being included in the delimiter field;
scrambling each data portion at least in part based on the at least one of the plurality of scrambler seeds; and
transmitting, via a transmitting device, the data unit.

2. The method of claim 1, wherein the data portions comprise code words.

3. The method of claim 1, wherein at least one of the scrambler seeds is prepended to a media access control header of the at least one media access control protocol data unit.

4. The method of claim 1, wherein:
multiple media access control protocol data units are aggregated into an aggregated media access control protocol data unit.

5. The method of claim 1, wherein the at least one of the plurality of scrambler seeds is inserted in reserved bits of the delimiter field.

6. The method of claim 1, wherein the at least one of the plurality of scrambler seeds is inserted in a delimiter signature field of the delimiter field.

7. An apparatus for wireless communication, comprising:
a processor configured to:
insert a plurality of scrambler seeds into a data unit comprising a plurality of data portions comprising at least one media access control protocol data unit, the at least one media access control protocol data unit including a delimiter field, and at least one of the plurality of scrambler seeds being included in the delimiter field;
scramble each data portion at least in part based on the at least one of the plurality of scrambler seeds; and
a transmitter configured to transmit the data unit.

8. The apparatus of claim 7, wherein the processor is configured to prepend at least one of the scrambler seeds to a media access control header of the at least one media access control protocol data unit.

9. The apparatus of claim 7, wherein the processor is configured to:
aggregate multiple media access control protocol data units into an aggregated media access control protocol data unit.

10. The apparatus of claim 7, wherein the processor is configured to insert the at least one of the plurality of scrambler seeds in reserved bits of the delimiter field.

11. The apparatus of claim 7, wherein the processor is configured to insert the at least one of the plurality of scrambler seeds in a delimiter signature field of the delimiter field.

12. A method for wireless communication, comprising:
receiving, via a receiving device, a data unit comprising a plurality of data portions comprising at least one media access control protocol data unit, the at least one media access control protocol data unit including a delimiter field;
identifying a plurality of scrambler seeds in the data unit, at least one of the plurality of scrambler seeds being included in the delimiter field; and
descrambling each data portion at least in part based on the at least one of the plurality of scrambler seeds.

13. The method of claim 12, wherein the data portions comprise code words.

14. The method of claim 12, wherein at least one of the scrambler seeds is prepended to a media access control header of the at least one media access control protocol data unit.

15. The method of claim 12, wherein:
multiple media access control protocol data units are aggregated into an aggregated media access control protocol data unit.

16. The method of claim 12, wherein the at least one of the plurality of scrambler seeds is inserted in reserved bits of the delimiter field.

17. The method of claim 12, wherein the at least one of the plurality of scrambler seeds is inserted in a delimiter signature field of the delimiter field.

18. An apparatus for wireless communication, comprising:
a receiver configured to receive a data unit comprising a plurality of data portions comprising at least one media access control protocol data unit, the at least one media access control protocol data unit including a delimiter field;
a processor configured to:
identify a plurality of scrambler seeds in the data unit, at least one of the plurality of scrambler seeds being included in the delimiter field; and
descramble each data portion based at least in part on the at least one of the plurality of scrambler seeds.

19. The apparatus of claim 18, wherein the processor is configured to process at least one of the scrambler seeds prepended to a media access control header of the at least one media access control protocol data unit.

20. The apparatus of claim 18, wherein the processor is configured to process:
multiple media access control protocol data units aggregated into an aggregated media access control protocol data unit.

21. The apparatus of claim 18, wherein the processor is configured to process the at least one of the plurality of scrambler seeds inserted in reserved bits of the delimiter field.

22. The apparatus of claim 18, wherein the processor is configured to process the at least one of the plurality of scrambler seeds inserted in a delimiter signature field of the delimiter field.

* * * * *